United States Patent
Chen

(10) Patent No.: US 7,151,807 B2
(45) Date of Patent: Dec. 19, 2006

(54) FAST ACQUISITION OF TIMING AND CARRIER FREQUENCY FROM RECEIVED SIGNAL

(75) Inventor: Ernest C. Chen, San Pedro, CA (US)

(73) Assignee: The DirecTV Group, Inc., El Segundo, CA (US)

(*) Notice: Subject to any disclaimer, the term of this patent is extended or adjusted under 35 U.S.C. 154(b) by 438 days.

(21) Appl. No.: 10/693,421

(22) Filed: Oct. 24, 2003

(65) Prior Publication Data
US 2004/0141575 A1 Jul. 22, 2004

Related U.S. Application Data

(63) Continuation-in-part of application No. 09/844,401, filed on Apr. 27, 2001.

(60) Provisional application No. 60/421,292, filed on Oct. 25, 2002.

(51) Int. Cl.
H03D 3/22 (2006.01)
(52) U.S. Cl. ...................................... 375/329
(58) Field of Classification Search ................ 375/326, 375/327, 329, 260, 279; 370/210
See application file for complete search history.

(56) References Cited

U.S. PATENT DOCUMENTS

| | | | |
|---|---|---|---|
| 3,383,598 A | 5/1968 | Sanders | |
| 3,878,468 A | 4/1975 | Falconer et al. | |
| 3,879,664 A | 4/1975 | Monsen | |
| 3,974,449 A | 8/1976 | Falconer | |
| 4,039,961 A | 8/1977 | Ishio et al. | |
| 4,068,186 A | 1/1978 | Sato et al. | |
| 4,213,095 A | 7/1980 | Falconer | |
| 4,253,184 A | 2/1981 | Gitlin et al. | |
| 4,283,684 A | 8/1981 | Satoh | |
| 4,384,355 A | 5/1983 | Werner | |
| RE31,351 E | 8/1983 | Falconer | |
| 4,416,015 A | 11/1983 | Gitlin | |
| 4,500,984 A | 2/1985 | Shimbo et al. | |
| 4,519,084 A | 5/1985 | Langseth | |
| 4,594,725 A | 6/1986 | Desperben et al. | |
| 4,628,507 A | 12/1986 | Otani | |
| 4,637,017 A | 1/1987 | Assal et al. | |
| 4,647,873 A | 3/1987 | Beckner et al. | |
| 4,654,863 A | 3/1987 | Belfield et al. | |

(Continued)

FOREIGN PATENT DOCUMENTS

DE 3642213 12/1986

(Continued)

OTHER PUBLICATIONS

Fang, T. et al.; "Fourth-Power Law Clock Recovery with Prefiltering", Proceedings of the International Conference on Communications (ICC), Geneva, May 23-26, 1993, New York, IEEE, US, vol. 3, May 23, 1993, pp. 811-815, XP010137089, ISBN:0-7803-0950-2, Section I, Introduction.

(Continued)

Primary Examiner—Emmanuel Bayard
(74) Attorney, Agent, or Firm—Georgann S. Grunebach

(57) ABSTRACT

A method and apparatus for determining the symbol timing and carrier frequency of a digitized input signal is disclosed. In one embodiment, the method comprises the steps of computing a temporally varying magnitude of the input signal, determining a frequency domain representation of the computed magnitude of the input signal, identifying a spectral component at a symbol frequency $f_s$ away from a DC component of the frequency domain representation of the computed magnitude of the input signal, the spectral component having a magnitude and a phase, and determining the symbol timing phase of the input signal from the phase of the spectral component.

37 Claims, 23 Drawing Sheets

U.S. PATENT DOCUMENTS

| | | | |
|---|---|---|---|
| 4,670,789 A | 6/1987 | Plume | |
| 4,709,374 A | 11/1987 | Farrow | |
| 4,800,573 A | 1/1989 | Cupo | |
| 4,835,790 A | 5/1989 | Yoshida et al. | |
| 4,847,864 A | 7/1989 | Cupo | |
| 4,860,315 A | 8/1989 | Hosoda et al. | |
| 4,878,030 A | 10/1989 | Vincze | |
| 4,896,369 A | 1/1990 | Adams, Jr. et al. | |
| 4,918,708 A | 4/1990 | Pottinger et al. | |
| 4,993,047 A | 2/1991 | Moffatt et al. | |
| 5,088,110 A | 2/1992 | Bonnerot et al. | |
| 5,111,155 A | 5/1992 | Keate et al. | |
| 5,121,414 A | 6/1992 | Levine et al. | |
| 5,199,047 A | 3/1993 | Koch | |
| 5,221,908 A | 6/1993 | Katz et al. | |
| 5,229,765 A | 7/1993 | Gardner | |
| 5,233,632 A | 8/1993 | Baum et al. | |
| 5,285,480 A | 2/1994 | Chennakeshu et al. | |
| 5,317,599 A | 5/1994 | Obata | |
| 5,329,311 A | 7/1994 | Ward et al. | |
| 5,430,770 A | 7/1995 | Abbey | |
| 5,450,623 A | 9/1995 | Yokoyama et al. | |
| 5,467,197 A | 11/1995 | Hoff | |
| 5,493,307 A | 2/1996 | Tsujimoto | |
| 5,555,257 A | 9/1996 | Dent | |
| 5,557,067 A | 9/1996 | Messelhi | |
| 5,577,067 A | 11/1996 | Zimmerman | |
| 5,577,087 A | 11/1996 | Furuya | |
| 5,579,344 A | 11/1996 | Namekata | |
| 5,581,229 A | 12/1996 | Hunt | |
| 5,602,868 A | 2/1997 | Wilson | |
| 5,603,084 A | 2/1997 | Henry et al. | |
| 5,606,286 A | 2/1997 | Bains | |
| 5,625,640 A | 4/1997 | Palmer et al. | |
| 5,642,358 A | 6/1997 | Dent | |
| 5,648,955 A | 7/1997 | Jensen et al. | |
| 5,732,113 A | 3/1998 | Schmidt et al. | |
| 5,793,818 A | 8/1998 | Claydon et al. | |
| 5,815,531 A | 9/1998 | Dent | |
| 5,819,157 A | 10/1998 | Ben-Efraim et al. | |
| 5,828,710 A | 10/1998 | Beale | |
| 5,848,060 A | 12/1998 | Dent | |
| 5,870,443 A * | 2/1999 | Rahnema | 375/355 |
| 5,940,025 A | 8/1999 | Koehnke et al. | |
| 5,956,373 A | 9/1999 | Goldston et al. | |
| 5,960,040 A | 9/1999 | Cai et al. | |
| 5,963,845 A | 10/1999 | Floury et al. | |
| 5,966,048 A | 10/1999 | Thompson | |
| 5,966,186 A | 10/1999 | Shigihara et al. | |
| 5,966,412 A | 10/1999 | Ramaswamy | |
| 5,970,098 A | 10/1999 | Herzberg | |
| 5,987,068 A | 11/1999 | Cassia et al. | |
| 5,995,832 A | 11/1999 | Mallinckrodt | |
| 5,999,793 A | 12/1999 | Ben-Efraim et al. | |
| 6,008,692 A | 12/1999 | Escartin | |
| 6,018,556 A | 1/2000 | Janesch et al. | |
| 6,021,159 A | 2/2000 | Nakagawa | |
| 6,028,894 A | 2/2000 | Oishi et al. | |
| 6,032,026 A | 2/2000 | Seki et al. | |
| 6,034,952 A | 3/2000 | Dohi et al. | |
| 6,052,586 A | 4/2000 | Karabinis | |
| 6,055,278 A | 4/2000 | Ho et al. | |
| 6,061,393 A | 5/2000 | Tsui et al. | |
| 6,084,919 A | 7/2000 | Kleider et al. | |
| 6,108,374 A | 8/2000 | Balachandran et al. | |
| 6,125,148 A | 9/2000 | Frodigh et al. | |
| 6,128,357 A | 10/2000 | Lu et al. | |
| 6,131,013 A | 10/2000 | Bergstrom et al. | |
| 6,140,809 A | 10/2000 | Doi | |
| 6,141,534 A | 10/2000 | Snell et al. | |
| 6,144,708 A | 11/2000 | Maruyama | |
| 6,166,601 A | 12/2000 | Shalom et al. | |
| 6,178,158 B1 | 1/2001 | Suzuki et al. | |
| 6,188,717 B1 | 2/2001 | Kaiser et al. | |
| 6,212,360 B1 | 4/2001 | Fleming, III et al. | |
| 6,219,095 B1 | 4/2001 | Zhang et al. | |
| 6,249,180 B1 | 6/2001 | Maalej et al. | |
| 6,266,534 B1 | 7/2001 | Raith et al. | |
| 6,272,679 B1 | 8/2001 | Norin | |
| 6,275,678 B1 | 8/2001 | Bethscheider et al. | |
| 6,297,691 B1 | 10/2001 | Anderson et al. | |
| 6,304,594 B1 | 10/2001 | Salinger | |
| 6,307,435 B1 | 10/2001 | Nguyen et al. | |
| 6,320,919 B1 | 11/2001 | Khayrallah et al. | |
| 6,325,332 B1 | 12/2001 | Cellier et al. | |
| 6,330,336 B1 | 12/2001 | Kasama | |
| 6,333,924 B1 | 12/2001 | Porcelli et al. | |
| 6,366,309 B1 | 4/2002 | Siegle | |
| 6,389,002 B1 | 5/2002 | Schilling | |
| 6,411,659 B1 | 6/2002 | Liu et al. | |
| 6,411,797 B1 | 6/2002 | Estinto | |
| 6,426,822 B1 | 7/2002 | Winter et al. | |
| 6,429,740 B1 | 8/2002 | Nguyen et al. | |
| 6,433,835 B1 | 8/2002 | Hartson et al. | |
| 6,501,804 B1 | 12/2002 | Rudolph et al. | |
| 6,515,713 B1 | 2/2003 | Nam | |
| 6,535,497 B1 | 3/2003 | Raith | |
| 6,535,801 B1 | 3/2003 | Geier et al. | |
| 6,574,235 B1 | 6/2003 | Arslan et al. | |
| 6,597,750 B1 | 7/2003 | Knutson et al. | |
| 6,718,184 B1 | 4/2004 | Aiken et al. | |
| 6,731,700 B1 | 5/2004 | Yakhnich et al. | |
| 6,741,662 B1 | 5/2004 | Francos et al. | |
| 6,745,050 B1 | 6/2004 | Forsythe et al. | |
| 6,775,521 B1 | 8/2004 | Chen | |
| 6,892,068 B1 | 5/2005 | Karabinis et al. | |
| 6,934,314 B1 | 8/2005 | Harles et al. | |
| 6,970,496 B1 | 11/2005 | Ben-Bassat et al. | |
| 2001/0012322 A1 | 8/2001 | Nagaoka et al. | |
| 2001/0024479 A1 | 9/2001 | Samarasooriya | |
| 2002/0006795 A1 | 1/2002 | Norin et al. | |
| 2002/0071506 A1 | 6/2002 | Lindquist et al. | |
| 2002/0158619 A1 | 10/2002 | Chen | |
| 2002/0176516 A1 | 11/2002 | Jeske et al. | |
| 2003/0002471 A1 | 1/2003 | Crawford et al. | |
| 2003/0138037 A1* | 7/2003 | Kaku et al. | 375/229 |
| 2004/0110467 A1 | 6/2004 | Wang | |
| 2004/0146296 A1 | 7/2004 | Gerszberg et al. | |
| 2005/0008100 A1 | 1/2005 | Chen | |
| 2006/0056541 A1 | 3/2006 | Chen et al. | |

FOREIGN PATENT DOCUMENTS

| | | |
|---|---|---|
| EP | 0222076 | 8/1986 |
| EP | 0238822 | 9/1987 |
| EP | 0356096 | 2/1990 |
| EP | 0929164 | 7/1999 |
| FR | 2696295 | 4/1994 |
| JP | 2-5631 | 1/1990 |
| JP | 2-95033 | 4/1990 |
| JP | 03139027 | 6/1991 |
| JP | 5-41683 | 2/1993 |
| JP | 5-114878 | 5/1993 |
| JP | 5-252084 | 9/1993 |
| JP | 07-038615 | 2/1995 |
| WO | WO 99/2001 | 4/1999 |
| WO | WO 02/073817 | 9/2002 |
| WO | WO 2005/074171 | 8/2005 |
| WO | WO 2005/086444 | 9/2005 |

OTHER PUBLICATIONS

Janssen, G.J.M; Slimane, S.B.: "Performance of a Multiuser Detector for M-PSK Signals Based on Successive Cancellation", ICC 2001, 2001 IEEE International Conference on Communications, Conference Record, Helsinky, Finland, Jun. 11-14, 2001, XP010552960.

Slimane, S.B.; Janssen, G.J.M.: "Power Optimization of M-PSK Cochannel Signals for a Narrowband Multiuser Detector", 2001 IEEE Pacific Rim Conference on Communications, Computer and Signal Processing, Victoria, B.C., Canada, Aug. 26-28, 2001, XP010560334.

Soong, A.C.K.; Krzymien, W.A.: "Performance of a Reference Symbol Assisted Multistage Successive Interference Cancelling Receiver in a Multicell CDMA Wireless System", Conference Record, Communication Theory Mini-Conference GlobeCom '95, IEEE Singapore Nov. 13-17, 1995, XP010159490.

Arslan, H; Molnar, K: "Iterative Co-channel Interference Cancellation in Narrowband Mobile Radio Systems", Emerging Technologies Symposium: Broadband Wireless Internet Access, 2000 IEEE Apr. 10-11, 2000, Piscataway, New Jersy, US, XP010538900.

Mazzini, Gianluca: "Power Division Multiple Access", Universal Personal Communications, 1998, ICUPC 1998, IEEE 1998, International Conference on Florence, Italy, Oct. 5-9 1998, New York, NY, US, IEEE, US Oct. 5, 1998, pp. 543-546, XP010314962 ISBN: 0-7803-5106-1.

Saleh, A.A.M. et al.: "Adaptive Linearization of Power Amplifiers in Digital Radio Systems", Bell System Technical Journal, American Telephone and Telegraph Co., New York, US, vol. 62, No. 4, Part 1, Apr. 1, 1983, pp. 1019-1033, XP002028354.

Ramchandran, Kannan et al.: Multiresolution Broadcast for Digital HDTV Using Joint Source/Channel Coding, IEEE, vol. 11, No. 1, Jan. 1993, pp. 6-22.

Meyr, Heinrich et al.; "Digital Communication Receivers—Synchronization, Channel Estimation, and Signal Processing"; John Wiley & Sons, Inc.; 1998; pp. 212-213 and 217-218; XP 002364874.

Meyr, Heinrich et al.; "Digital Communication Receivers—Synchronization, Channel Estimation, and Signal Processing"; John Wiley & Sons, Inc.; 1998; pp. 610-612; XP 002364876.

Wolcott, Ted J. et al.; "Uplink-Noise Limited Satellite Channels"; IEEE 1995; pp. 717-721; XP-00580915.

Seskar, Ivan et al.; "Implementation Aspects for Successive Interface Cancellation in DS/CDMA Systems"; Wireless Networks; 1998; pp. 447-452.

Earth Section Technology; 1986; pp. 404-412; XP-002248387.

Chen, Ernest et al.; "DVB-S2 Backward-Compatible Modes: A Bridge Between the Present and the Future"; International Journal of Satellite Communications and Networking; vol. 22, Issue 3, pp. 341-365; published 2004 by John Wiley & Sons, Ltd.

The Authoritive Dictionary of IEEE Standards Terms; Seventh Edition, pp. 1047 definition of "signal".

\* cited by examiner

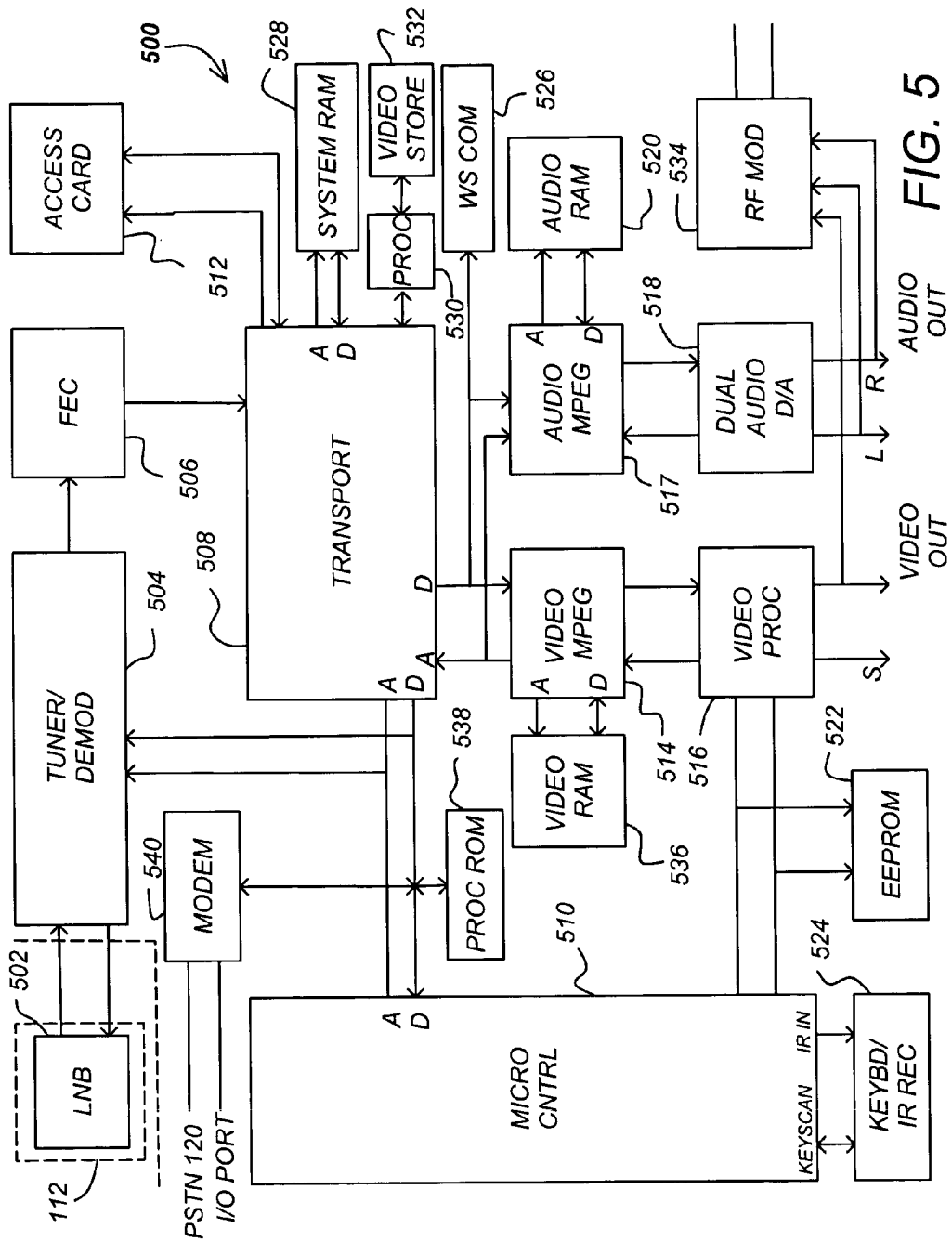

FAST ACQUISITION OF TIMING AND CARRIER FREQUENCY FROM RECEIVED SIGNAL

CROSS-REFERENCE TO RELATED APPLICATIONS

This application claims benefit of U.S. Provisional Patent Application No. 60/421,292, entitled "FAST ACQUISITION OF TIMING AND CARRIER FREQUENCY FROM RECEIVED SIGNAL," by Ernest C. Chen, filed Oct. 25, 2002, which application is hereby incorporated by reference herein.

This application is also a continuation-in-part of the following co-pending and commonly assigned patent application(s), all of which applications are incorporated by reference herein:

Utility application Ser. No. 09/844,401, filed Apr. 27, 2001, by Ernest C. Chen, entitled "LAYERED MODULATION FOR DIGITAL SIGNALS."

BACKGROUND OF THE INVENTION

1. Field of the Invention

The present invention relates to systems and methods for receiving data, and in particular to a system and method for quickly acquiring the timing and carrier frequency of a transmitted signal.

2. Description of the Related Art

Digital signal communication systems have been used in various fields, including digital TV signal transmission, either terrestrial or satellite. As the various digital signal communication systems and services evolve, there is a burgeoning demand for increased data throughput and added services. However, it is more difficult to implement either improvement in old systems and new services when it is necessary to replace existing legacy hardware, such as transmitters and receivers. New systems and services are advantaged when they can utilize existing legacy hardware. In the realm of wireless communications, this principle is further highlighted by the limited availability of electromagnetic spectrum. Thus, it is not possible (or at least not practical) to merely transmit enhanced or additional data at a new frequency.

The conventional method of increasing spectral capacity is to move to a higher-order modulation, such as from quadrature phase shift keying (QPSK) to eight phase shift keying (8PSK) or sixteen quadrature amplitude modulation (16QAM). Unfortunately, QPSK receivers cannot demodulate conventional 8PSK or 16QAM signals. As a result, legacy customers with QPSK receivers must upgrade their receivers in order to continue to receive any signals transmitted with an 8PSK or 16QAM modulation.

It is advantageous for systems and methods of transmitting signals to accommodate enhanced and increased data throughput without requiring additional frequency. In addition, it is advantageous for enhanced and increased throughput signals for new receivers to be backwards compatible with legacy receivers. There is further an advantage for systems and methods which allow transmission signals to be upgraded from a source separate from the legacy transmitter.

It has been proposed that a layered modulation signal, transmitting non-coherently both upper and lower layer signals, can be employed to meet these needs. Such layered modulation systems allow higher information throughput with backwards compatibility. However, even when backward compatibility is not required (such as with an entirely new system), layered modulation can still be advantageous because it requires a TWTA peak power significantly lower than that for a conventional 8PSK or 16QAM modulation format for a given throughput.

The acquisition of a signal in a digital communications system typically requires the convergence of several signal processing algorithms before the receiver can output meaningful data. These algorithms are adaptive in nature and need to process multiple received symbols before convergence is achieved. Because of the feedback nature inherent in these algorithms, the various adaptive receiver sections are often referred to as loops. Certain receiver loops depend on other loops. Depending on the algorithm implemented, it is possible that a given loop cannot converge until one or more previous loops have sufficiently converged. The major receiver loops are include an automatic gain control (AGC) loop, a timing recovery loop (TRL) and a carrier recovery loop (CRL). Typically, AGC loop must converge before the TRL loop, and the TRL loop must converge before the CRL, although the order may sometimes vary depending on the implementation.

The AGC loop scales the signal to a known power level. AGC is typically handled in the analog domain to properly scale the signal for analog-to-digital (A/D) conversion because A/D converters have a limited dynamic range. If the received signal strength is too high, the A/D conversion process will introduce a type of distortion known as clipping. If the signal strength is too low, the signal variations will toggle only a few bits at the A/D, and distortion will occur because of severe quantization.

The convergence of the AGC loop is also required for several other receiver blocks. Certain parameters and gains for various adaptive algorithms, as well as boundaries for symbol decision regions at the slicer, are based on the signal being at a known power level. In addition to the analog AGC, many receivers implement an additional AGC in the digital domain for fine signal scaling.

The TRL obtains symbol synchronization. Typically, two quantities must be determined by the receiver to achieve symbol synchronization. The first is the sampling frequency. Locking the sampling frequency requires estimating the symbol period so that samples can be taken at the correct rate. Although this quantity should be known (e.g., the system's symbol rate is specified to be 20 MHz), oscillator drift will introduce deviations from the stated symbol rate.

The other quantity to determine is sampling phase. Locking the sampling phase involves determining the correct time within a symbol period to take a sample. Real-world symbol pulse shapes have a peak in the center of the symbol period. Sampling the symbol at this peak results in the best signal-to-noise-ratio and will ideally eliminate interference from other symbols. This type of interference is known as intersymbol interference.

An oscillator at the transmitter generates a sinusoidal carrier signal that ideally exists at some known carrier frequency. Due to oscillator drift, the actual frequency of the carrier will deviate slightly from the ideal value. Other oscillators along the transmission and receiving path including the satellite and receiver front end also contribute to carrier frequency deviation. The carrier is multiplied by the data to modulate the signal up to a passband center frequency. At the receiver, the passband signal is multiplied by a sinusoid generated by the local oscillator.

Preferably, the frequency of the local oscillator will exactly match the frequency of the received signal. In practice, their frequencies differ and, instead of demodulation bringing the signal to baseband, the signal will be near baseband with some frequency offset. The presence of this frequency offset will cause the received signal constellation to rotate. This "spinning" effect must be removed before accurate symbol decisions can be made. The purpose of the CRL is to remove this frequency offset so that the signal can be processed directly at baseband.

It is desirable that the TRL and the CRL converge as rapidly as possible. Both TRL and CRL performance is improved with an accurate initial estimate of the symbol timing and the carrier frequency. What is needed is a system and method for quickly acquiring the symbol timing and carrier frequency of a received signal. The present invention meets this need and provides further advantages as detailed hereafter.

SUMMARY OF THE INVENTION

To address the requirements described above, the present invention discloses a method and apparatus for determining the symbol timing and carrier frequency of a digitized input signal. In one embodiment, the method comprises the steps of computing a temporally varying magnitude of the input signal, determining a frequency domain representation of the computed magnitude of the input signal, identifying a spectral component at a symbol frequency $f_s$ away from a DC component of the frequency domain representation of the computed magnitude of the input signal, the spectral component having a magnitude and a phase, and determining the symbol timing phase of the input signal from the phase of the spectral component. In another embodiment, the method acquires a carrier frequency in a input signal, and comprising the steps of computing an $N^{th}$ power of the input signal, determining a frequency domain representation of the computed $N^{th}$ power of the input signal, the frequency domain representation including spectral components spaced at $$\frac{f_s}{N},$$

wherein $f_s$ is a symbol frequency of the input signal, and selecting one of the spectral components as the acquired carrier frequency.

BRIEF DESCRIPTION OF THE DRAWINGS

Referring now to the drawings in which like reference numbers represent corresponding parts throughout:

FIG. 5 is a block diagram of an integrated receiver/decoder;

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

In the following description, reference is made to the accompanying drawings which form a part hereof, and which show, by way of illustration, several embodiments of the present invention. It is understood that other embodiments may be utilized and structural changes may be made without departing from the scope of the present invention.

Video Distribution System

Figure 1:
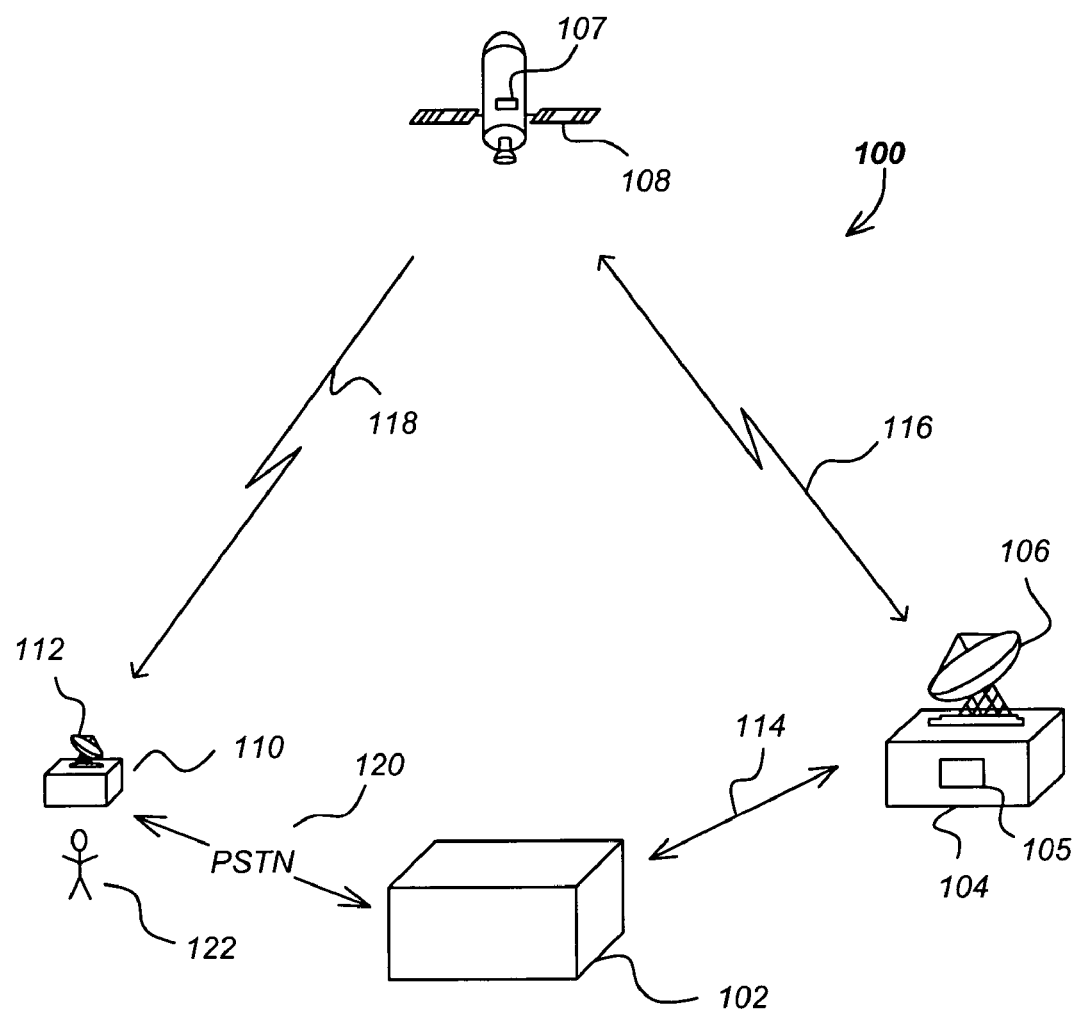
FIG. 1 is a diagram illustrating an overview of a single satellite video distribution system.

FIG. 1 is a diagram illustrating an overview of a single satellite video distribution system 100. The video distribution system 100 comprises a control center 102 in communication with an uplink center 104 via a ground or other link 114 and with a subscriber receiver station 110 via a public switched telephone network (PSTN) or other link 120. The control center 102 provides program material (e.g. video programs, audio programs and data) to the uplink center 104 and coordinates with the subscriber receiver stations 110 to offer, for example, pay-per-view (PPV) program services, including billing and associated decryption of video programs.

The uplink center 104 receives program material and program control information from the control center 102, and using an uplink antenna 106 and transmitter 105, transmits the program material and program control information to the satellite 108. The satellite receives and processes this information, and transmits the video programs and control information to the subscriber receiver station 110 via downlink 118 using transmitter 107. The subscriber receiving station 110 receives this information using the outdoor unit (ODU) 112, which includes a subscriber antenna and a low noise block converter (LNB).

In one embodiment, the subscriber receiving station antenna is an 18-inch slightly oval-shaped Ku-band antenna. The slight oval shape is due to the 22.5 degree offset feed of the LNB (low noise block converter) which is used to receive signals reflected from the subscriber antenna. The offset feed positions the LNB out of the way so it does not block any surface area of the antenna minimizing attenuation of the incoming microwave signal.

The video distribution system 100 can comprise a plurality of satellites 108 in order to provide wider terrestrial coverage, to provide additional channels, or to provide additional bandwidth per channel. In one embodiment of the invention, each satellite comprises 16 transponders to receive and transmit program material and other control data from the uplink center 104 and provide it to the subscriber receiving stations 110. Using data compression and multiplexing techniques the channel capabilities, two satellites 108 working together can receive and broadcast over 150 conventional (non-HDTV) audio and video channels via 32 transponders.

While the invention disclosed herein will be described with reference to a satellite-based video distribution system 100, the present invention may also be practiced with terrestrial-based transmission of program information, whether by broadcasting means, cable, or other means. Further, the different functions collectively allocated among the control center 102 and the uplink center 104 as described above can be reallocated as desired without departing from the intended scope of the present invention.

Although the foregoing has been described with respect to an embodiment in which the program material delivered to the subscriber 122 is video (and audio) program material such as a movie, the foregoing method can be used to deliver program material comprising purely audio information or other data as well.

Uplink Configuration

Figure 2:
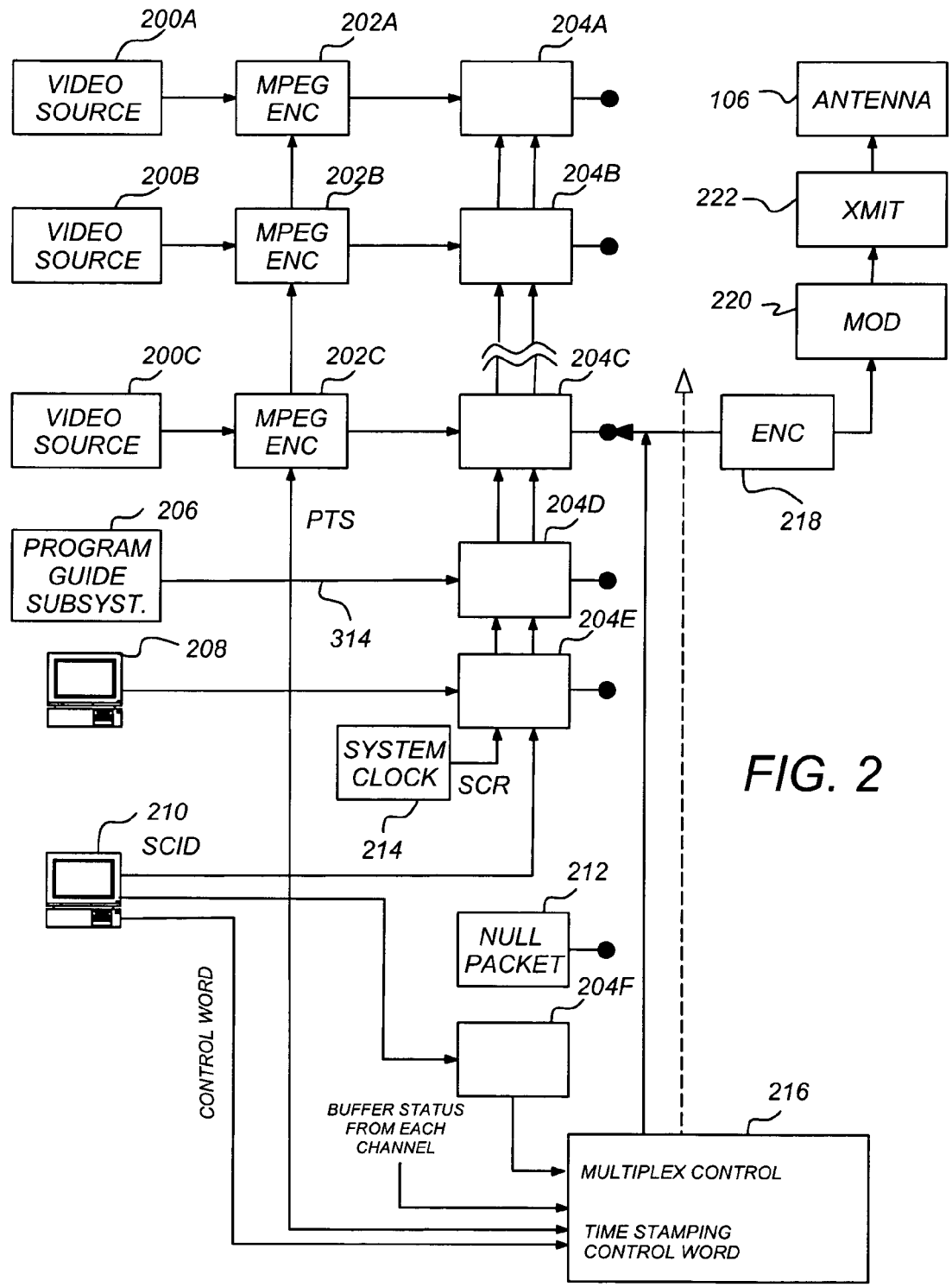
FIG. 2 is a block diagram showing a typical uplink configuration for a single satellite transponder.

FIG. 2 is a block diagram showing a typical uplink configuration for a single satellite 108 transponder, showing how video program material is uplinked to the satellite 108 by the control center 102 and the uplink center 104. FIG. 2 shows three video channels (which could be augmented respectively with one or more audio channels for high fidelity music, soundtrack information, or a secondary audio program for transmitting foreign languages), a data channel from a program guide subsystem 206 and computer data information from a computer data source 208.

The video channels are provided by a program source of video material 200A–200C (collectively referred to hereinafter as video source(s) 200). The data from each video program source 200 is provided to an encoder 202A–202C (collectively referred to hereinafter as encoder(s) 202). Each of the encoders accepts a program time stamp (PTS) from the controller 216. The PTS is a wrap-around binary time stamp that is used to assure that the video information is properly synchronized with the audio information after encoding and decoding. A PTS time stamp is sent with each I-frame of the MPEG encoded data.

In one embodiment of the present invention, each encoder 202 is a second generation Motion Picture Experts Group (MPEG-2) encoder, but other decoders implementing other coding techniques can be used as well. The data channel can be subjected to a similar compression scheme by an encoder (not shown), but such compression is usually either unnecessary, or performed by computer programs in the computer data source (for example, photographic data is typically compressed into *.TIF files or *.JPG files before transmission). After encoding by the encoders 202, the signals are converted into data packets by a packetizer 204A–204F (collectively referred to hereinafter as packetizer(s) 204) associated with each source 200.

The data packets are assembled using a reference from the system clock 214 (SCR), and from the conditional access manager 210, which provides the SCID to the packetizers 204 for use in generating the data packets. These data packets are then multiplexed into serial data and transmitted.

Broadcast Data Stream Format and Protocol

Figure 3A:
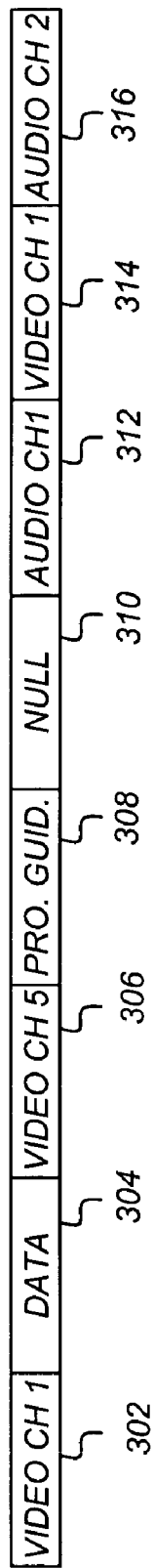
FIG. 3A is a diagram of a representative data stream.

FIG. 3A is a diagram of a representative data stream. The first packet segment 302 comprises information from video channel 1 (data coming from, for example, the first video program source 200A). The next packet segment 304 comprises computer data information that was obtained, for example from the computer data source 208. The next packet segment 306 comprises information from video channel 5 (from one of the video program sources 200). The next packet segment 308 comprises program guide information such as the information provided by the program guide subsystem 206. As shown in FIG. 3A, null packets 310 created by the null packet module 310 may be inserted into the data stream as desired.

The data stream therefore comprises a series of packets from any one of the data sources in an order determined by the controller 216. The data stream is encrypted by the encryption module 218, modulated by the modulator 220 (typically using a QPSK modulation scheme), and provided to the transmitter 222, which broadcasts the modulated data stream on a frequency bandwidth to the satellite via the antenna 106. The receiver 500 receives these signals, and using the SCID, reassembles the packets to regenerate the program material for each of the channels.

Figure 3B:
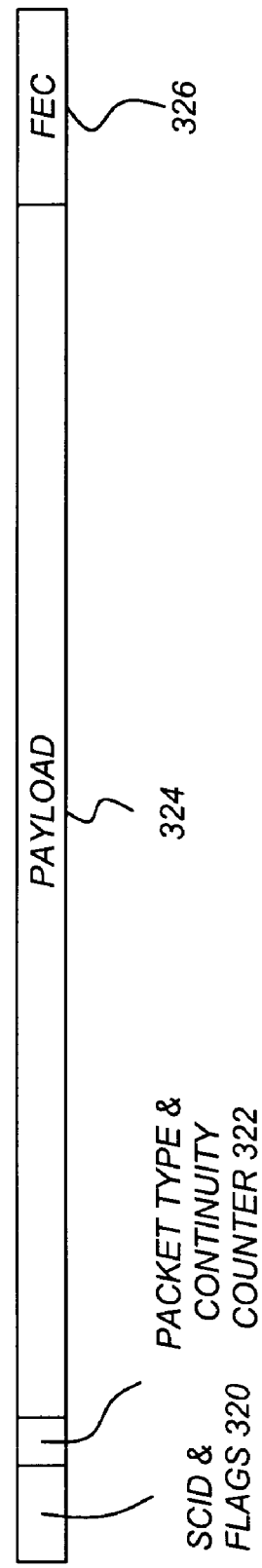
FIG. 3B is a diagram of a representative data packet.

FIG. 3B is a diagram of a data packet. Each data packet (e.g. 302–316) is 147 bytes long, and comprises a number of packet segments. The first packet segment 320 comprises two bytes of information containing the SCID and flags. The SCID is a unique 12-bit number that uniquely identifies the data packet's data channel. The flags include 4 bits that are used to control other features. The second packet segment 322 is made up of a 4-bit packet type indicator and a 4-bit continuity counter. The packet type identifies the packet as one of the four data types (video, audio, data, or null). When combined with the SCID, the packet type determines how the data packet will be used. The continuity counter increments once for each packet type and SCID. The next packet segment 324 comprises 127 bytes of payload data, which in the cases of packets 302 or 306 is a portion of the video program provided by the video program source 200. The final packet segment 326 is data required to perform forward error correction.

Figure 4:
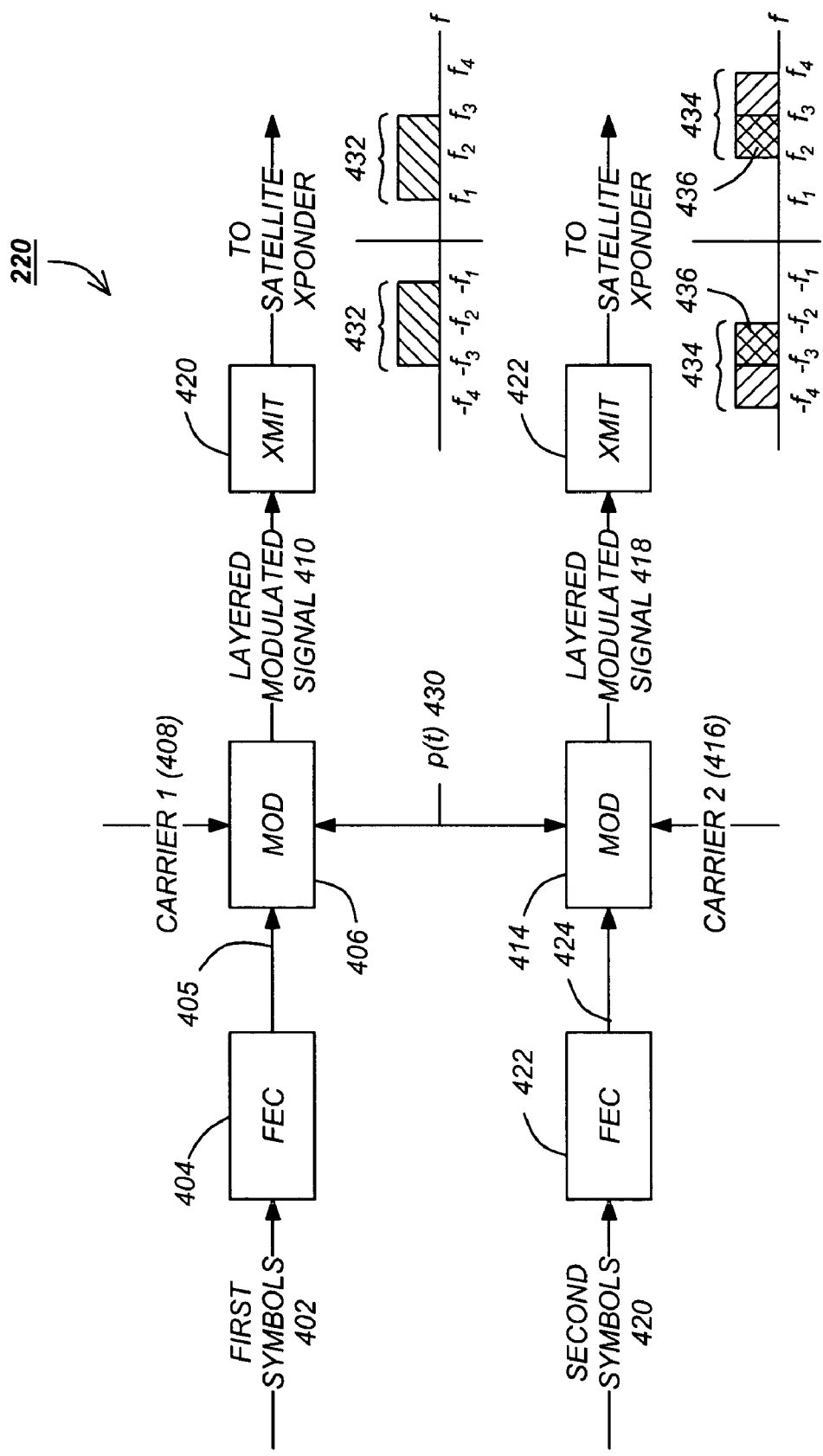
FIG. 4 is a block diagram showing one embodiment of the modulator.

FIG. 4 is a block diagram showing one embodiment of the modulator 220. The modulator 220 optionally comprises a forward error correction (FEC) encoder 404 which accepts the first signal symbols 402 and adds redundant information that are used to reduce transmission errors. The coded symbols 405 are modulated by modulator 406 according to a first carrier 408 to produce an upper layer modulated signal 410. Second symbols 420 are likewise provided to an optional second FEC encoder 422 to produce coded second symbols 422. The coded second symbols 422 are provided to a second modulator 414, which modulates the coded second signals according to a second carrier 416 to produce a lower layer modulated signal 418. The resulting signals are then transmitted by one or more transmitters 420, 422. The upper layer modulated signal 410 and the lower layer modulated signal 418 are therefore uncorrelated, and the frequency range used to transmit each layer can substantially or completely overlap the frequency spectrum used to transmit the other. For example, as shown in FIG. 4, the frequency spectrum $f_1 \rightarrow f_3$ 432 of the upper layer signal 410 may overlap the frequency spectrum $f_2 \rightarrow f_4$ 434 of the lower layer signal 418 in frequency band $f_2-f_3$ 436. The upper layer signal 410, however, must be a sufficiently greater amplitude signal than the lower layer signal 418, in order to maintain the signal constellations shown in FIG. 6 and FIG. 7. The modulator 220 may also employ pulse shaping techniques (illustrated by pulse p(t) 430) to account for the limited channel bandwidth. Although FIG. 4 illustrates the same pulse shaping p(t) 430 being applied to both layers, different pulse shaping can be applied to each layer as well.

Integrated Receiver/Decoder

FIG. 5 is a block diagram of an integrated receiver/decoder (IRD) 500 (also hereinafter alternatively referred to as receiver 500). The receiver 500 comprises a tuner/demodulator 504 communicatively coupled to an ODU 112 having one or more LNBs 502. The LNB 502 converts the 12.2- to 12.7 GHz downlink 118 signal from the satellites 108 to, e.g., a 950–1450 MHz signal required by the IRD's 500 tuner/demodulator 504. The LNB 502 may provide either a dual or a single output. The single-output LNB 502 has only one RF connector, while the dual output LNB 502 has two RF output connectors and can be used to feed a second tuner 504, a second receiver 500, or some other form of distribution system.

The tuner/demodulator 504 isolates a single, digitally modulated 24 MHz transponder, and converts the modulated data to a digital data stream. Further details regarding the demodulation of the received signal follow.

The digital data stream is then supplied to a forward error correction (FEC) decoder 506. This allows the IRD 500 to reassemble the data transmitted by the uplink center 104 (which applied the forward error correction to the desired signal before transmission to the subscriber receiving station 110) verifying that the correct data signal was received, and correcting errors, if any. The error-corrected data may be fed from the FEC decoder module 506 to the transport module 508 via an 8-bit parallel interface. The transport module 508 performs many of the data processing functions performed by the IRD 500. The transport module 508 processes data received from the FEC decoder module 506 and provides the processed data to the video MPEG decoder 514 and the audio MPEG decoder 517. In one embodiment of the present invention, the transport module, video MPEG decoder and audio MPEG decoder are all implemented on integrated circuits. This design promotes both space and power efficiency, and increases the security of the functions performed within the transport module 508. The transport module 508 also provides a passage for communications between the microcontroller 510 and the video and audio MPEG decoders 514, 517. As set forth more fully hereinafter, the transport module also works with the conditional access module (CAM) 512 to determine whether the subscriber receiving station 110 is permitted to access certain program material. Data from the transport module can also be supplied to external communication module 526.

The CAM 512 functions in association with other elements to decode an encrypted signal from the transport module 508. The CAM 512 may also be used for tracking and billing these services. In one embodiment of the present invention, the CAM 512 is a smart card, having contacts cooperatively interacting with contacts in the IRD 500 to pass information. In order to implement the processing performed in the CAM 512, the IRD 500, and specifically the transport module 508 provides a clock signal to the CAM 512.

Video data is processed by the MPEG video decoder 514. Using the video random access memory (RAM) 536, the MPEG video decoder 514 decodes the compressed video data and sends it to an encoder or video processor 516, which converts the digital video information received from the video MPEG module 514 into an output signal usable by a display or other output device. By way of example, processor 516 may comprise a National TV Standards Committee (NTSC) or Advanced Television Systems Committee (ATSC) encoder. In one embodiment of the invention both S-Video and ordinary video (NTSC or ATSC) signals are provided. Other outputs may also be utilized, and are advantageous if high definition programming is processed.

Audio data is likewise decoded by the MPEG audio decoder 517. The decoded audio data may then be sent to a digital to analog (D/A) converter 518. In one embodiment of the present invention, the D/A converter 518 is a dual D/A converter, one for the right and left channels. If desired, additional channels can be added for use in surround sound processing or secondary audio programs (SAPs). In one embodiment of the invention, the dual D/A converter 518 itself separates the left and right channel information, as well as any additional channel information. Other audio formats may similarly be supported. For example, other audio formats such as multi-channel DOLBY DIGITAL AC-3 may be supported.

A description of the processes performed in the encoding and decoding of video streams, particularly with respect to MPEG and JPEG encoding/decoding, can be found in Chapter 8 of "Digital Television Fundamentals," by Michael Robin and Michel Poulin, McGraw-Hill, 1998, which is hereby incorporated by reference herein.

The microcontroller 510 receives and processes command signals from the remote control 524, an IRD 500 keyboard interface, and/or another input device. The microcontroller receives commands for performing its operations from a processor programming memory, which permanently stores such instructions for performing such commands. The processor programming memory may comprise a read only memory (ROM) 538, an electrically erasable programmable read only memory (EEPROM) 522 or, similar memory device. The microcontroller 510 also controls the other digital devices of the IRD 500 via address and data lines (denoted "A" and "D" respectively, in FIG. 5).

The modem 540 connects to the customer's phone line via the PSTN port 120. It calls, e.g. the program provider, and transmits the customer's purchase information for billing purposes, and/or other information. The modem 540 is controlled by the microprocessor 510. The modem 540 can output data to other I/O port types including standard parallel and serial computer I/O ports.

The present invention also comprises a local storage unit such as the video storage device 532 for storing video and/or audio data obtained from the transport module 508. Video storage device 532 can be a hard disk drive, a read/writable compact disc of DVD, a solid state RAM, or any other storage medium. In one embodiment of the present invention, the video storage device 532 is a hard disk drive with specialized parallel read/write capability so that data may be read from the video storage device 532 and written to the device 532 at the same time. To accomplish this feat, additional buffer memory accessible by the video storage 532 or its controller may be used. Optionally, a video storage processor 530 can be used to manage the storage and retrieval of the video data from the video storage device 532. The video storage processor 530 may also comprise memory for buffering data passing into and out of the video storage device 532. Alternatively or in combination with the foregoing, a plurality of video storage devices 532 can be used. Also alternatively or in combination with the foregoing, the microcontroller 510 can also perform the operations required to store and or retrieve video and other data in the video storage device 532.

The video processing module 516 input can be directly supplied as a video output to a viewing device such as a video or computer monitor. In addition, the video and/or audio outputs can be supplied to an RF modulator 534 to produce an RF output and/or 8 vestigal side band (VSB) suitable as an input signal to a conventional television tuner. This allows the receiver 500 to operate with televisions without a video output.

Each of the satellites 108 comprises a transponder, which accepts program information from the uplink center 104, and relays this information to the subscriber receiving station 110. Known multiplexing techniques are used so that multiple channels can be provided to the user. These multiplexing techniques include, by way of example, various statistical or other time domain multiplexing techniques and polarization multiplexing. In one embodiment of the invention, a single transponder operating at a single frequency band carries a plurality of channels identified by respective service channel identification (SCID).

Preferably, the IRD 500 also receives and stores a program guide in a memory available to the microcontroller 510. Typically, the program guide is received in one or more data packets in the data stream from the satellite 108. The program guide can be accessed and searched by the execution of suitable operation steps implemented by the microcontroller 510 and stored in the processor ROM 538. The program guide may include data to map viewer channel numbers to satellite transponders and service channel identifications (SCIDs), and also provide TV program listing information to the subscriber 122 identifying program events.

The functionality implemented in the IRD 500 depicted in FIG. 5 can be implemented by one or more hardware modules, one or more software modules defining instructions performed by a processor, or a combination of both.

The present invention provides for the modulation of signals at different power levels and advantageously for the signals to be non-coherent from each layer. In addition, independent modulation and coding of the signals may be performed. Backwards compatibility with legacy receivers, such as a quadrature phase shift keying (QPSK) receiver is enabled and new services are provided to new receivers. A typical new receiver of the present invention uses two demodulators and one remodulator as will be described in detail hereafter.

In a typical backwards-compatible embodiment of the present invention, the legacy QPSK signal is boosted in power to a higher transmission (and reception) level. This creates a power "room" in which a new lower layer signal may operate. The legacy receiver will not be able to distinguish the new lower layer signal, from additive white Gaussian noise, and thus operates in the usual manner. The optimum selection of the layer power levels is based on accommodating the legacy equipment, as well as the desired new throughput and services.

The new lower layer signal is provided with a sufficient carrier to thermal noise ratio to function properly. The new lower layer signal and the boosted legacy signal are non-coherent with respect to each other. Therefore, the new lower layer signal can be implemented from a different TWTA and even from a different satellite. The new lower layer signal format is also independent of the legacy format, e.g., it may be QPSK or 8PSK, using the conventional concatenated FEC code or using a new Turbo code. The lower layer signal may even be an analog signal.

The combined layered signal is demodulated and decoded by first demodulating the upper layer to remove the upper carrier. The stabilized layered signal may then have the upper layer FEC decoded and the output upper layer symbols communicated to the upper layer transport. The upper layer symbols are also employed in a remodulator, to generate an idealized upper layer signal. The idealized upper layer signal is then subtracted from the stable layered signal to reveal the lower layer signal. The lower layer signal is then demodulated and FEC decoded and communicated to the lower layer transport.

Signals, systems and methods using the present invention may be used to supplement a pre-existing transmission compatible with legacy receiving hardware in a backwards-compatible application or as part of a preplanned layered modulation architecture providing one or more additional layers at a present or at a later date.

Layered Signals

Figure 6B:
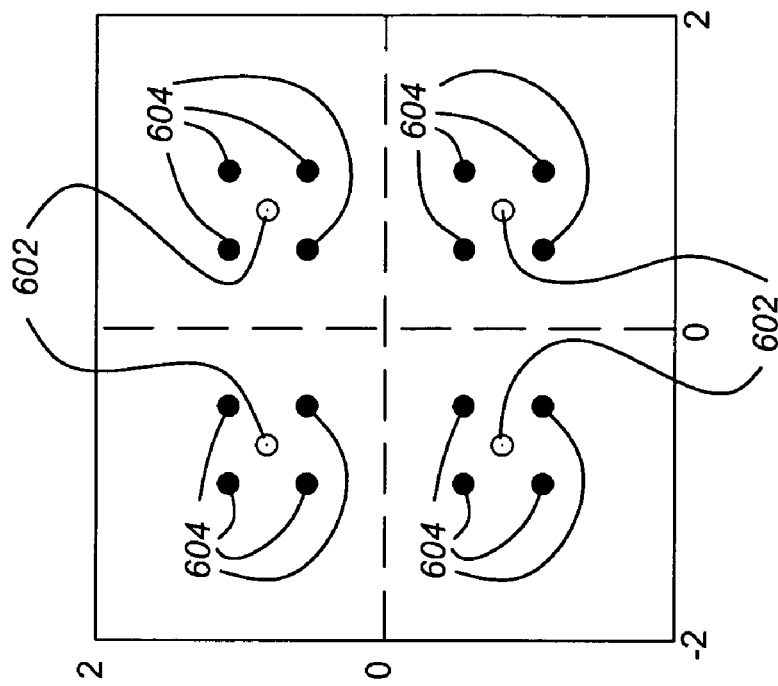
FIGS. 6A–6C are diagrams illustrating the basic relationship of signal layers in a layered modulation transmission.
Figure 6A:
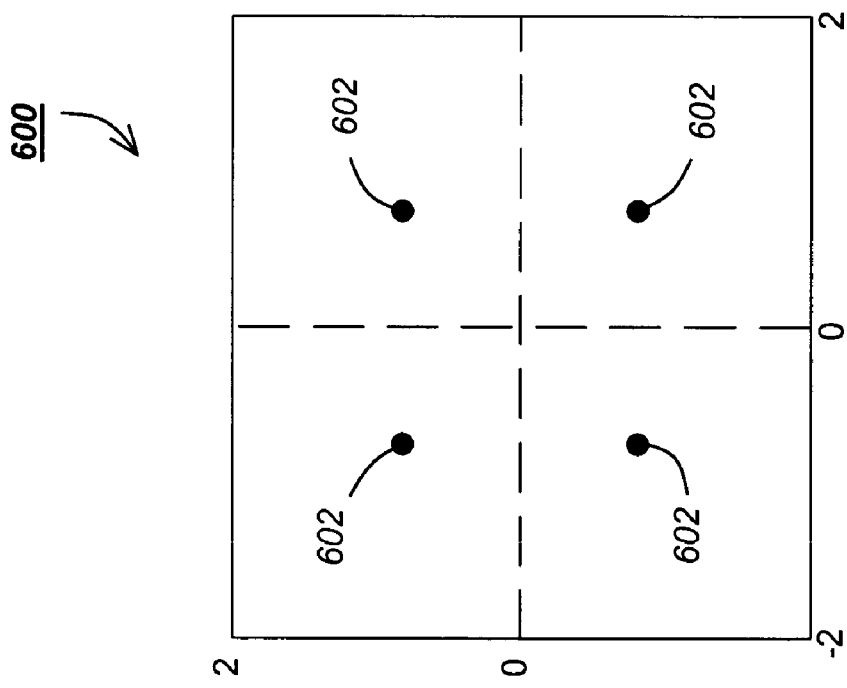
Figure 6C:
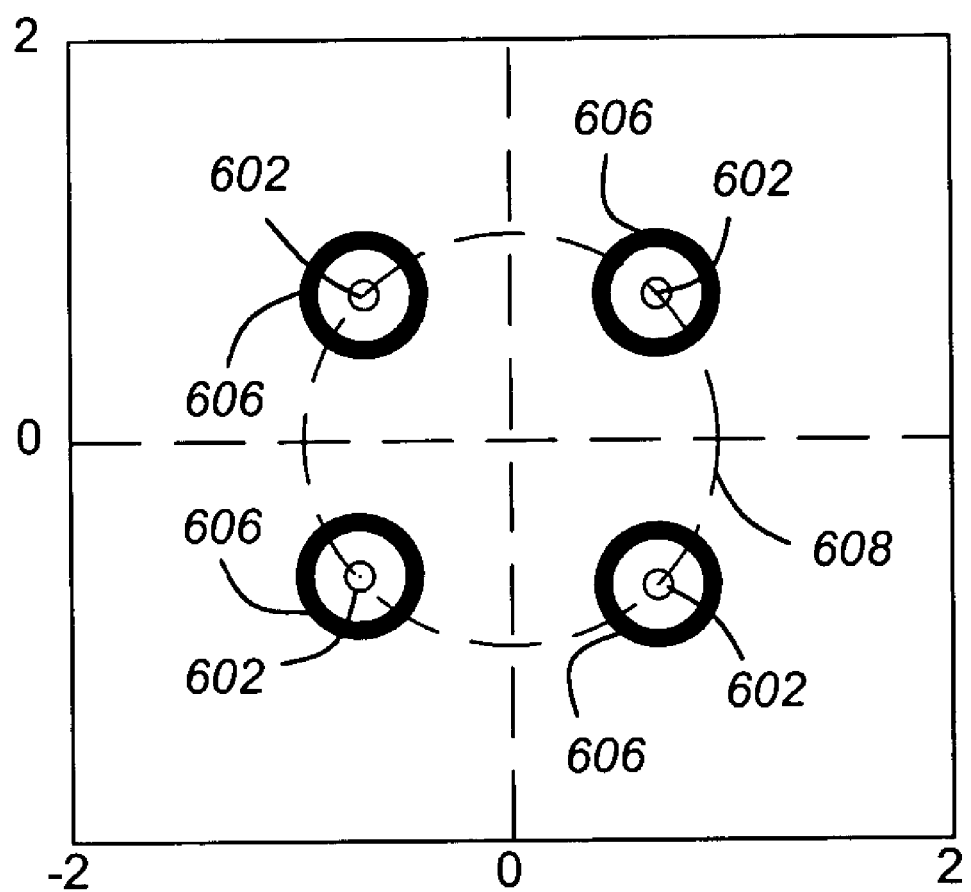

FIGS. 6A–6C illustrate the basic relationship of signal layers in a layered modulation transmission. FIG. 6A illustrates a first layer signal constellation 600 of a transmission signal showing the signal points or symbols 602. FIG. 6B illustrates the second layer signal constellation of symbols 604 over the first layer signal constellation 600 where the layers are coherent. FIG. 6C illustrates a second signal layer 606 of a second transmission layer over the first layer constellation where the layers may be non-coherent. The second layer 606 rotates about the first layer constellation 602 due to the relative modulating frequencies of the two layers in a non-coherent transmission. Both the first and second layers rotate about the origin due to the first layer modulation frequency as described by path 608.

Figure 7B:
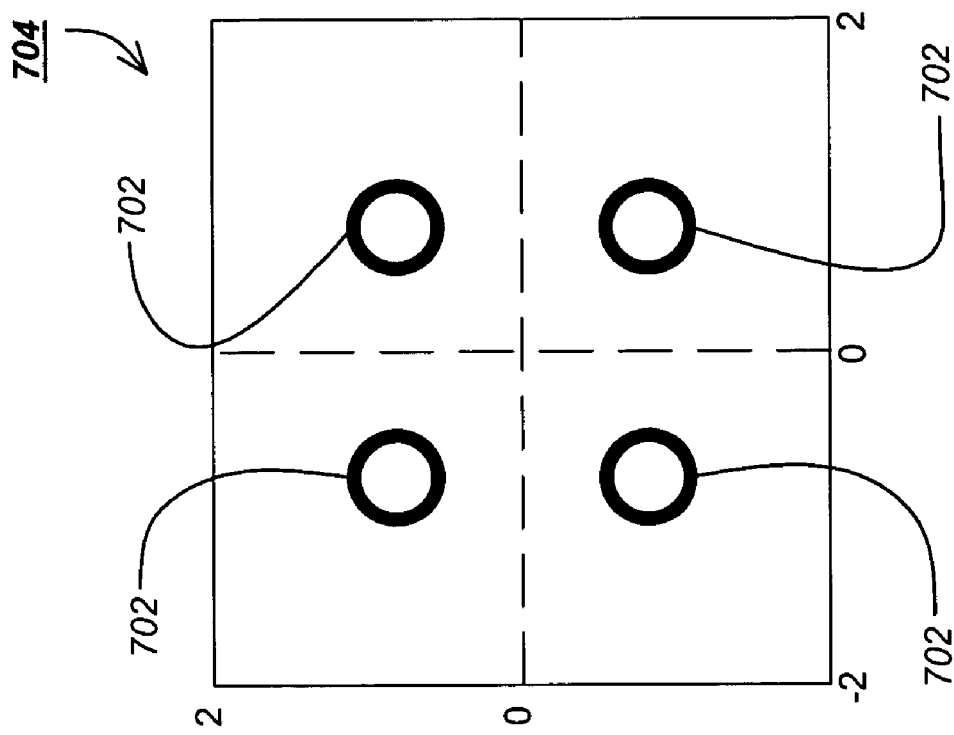
FIGS. 7A–7C are diagrams illustrating a signal constellation of a second transmission layer over the first transmission layer after first layer demodulation.
Figure 7A:
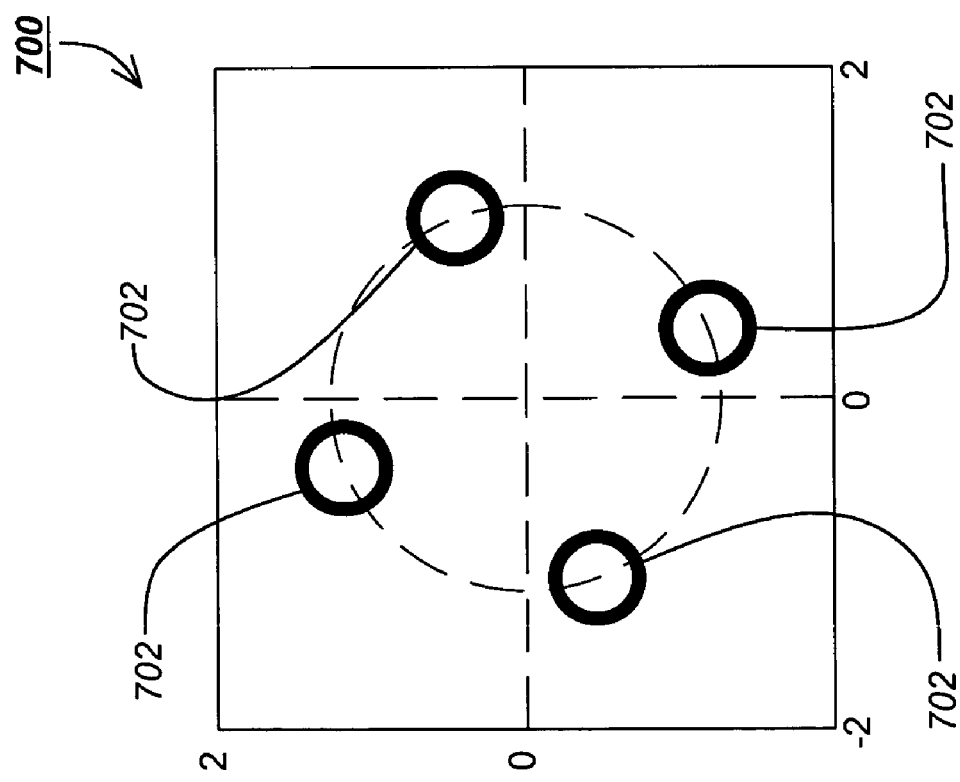
Figure 7C:
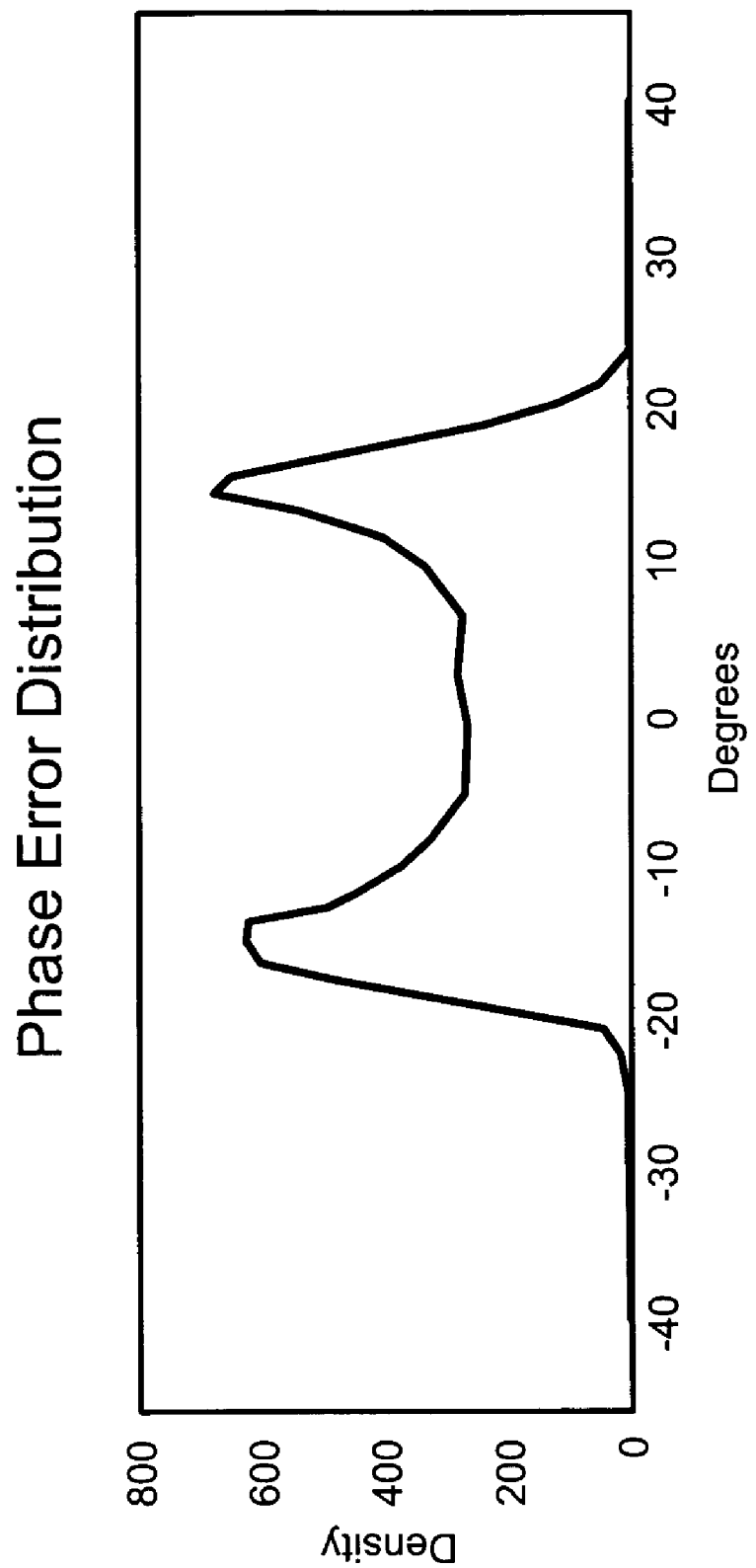

FIGS. 7A–7C are diagrams illustrating a signal constellation of a second transmission layer over the first transmission layer after first layer demodulation. FIG. 7A shows the constellation 700 before the first carrier recovery loop (CRL) and FIG. 7B shows the constellation 704 after CRL. In this case, the signal points of the second layer are actually rings 702. FIG. 7C depicts a phase distribution of the received signal with respect to nodes 602.

Relative modulating frequencies cause the second layer constellation to rotate around the nodes of the first layer constellation. After the second layer CRL this rotation is eliminated. The radius of the second layer constellation is determined by its power level. The thickness of the rings 702 is determined by the carrier to noise ratio (CNR) of the second layer. As the two layers are non-coherent, the second layer may also be used to transmit analog or digital signals.

Figure 8:
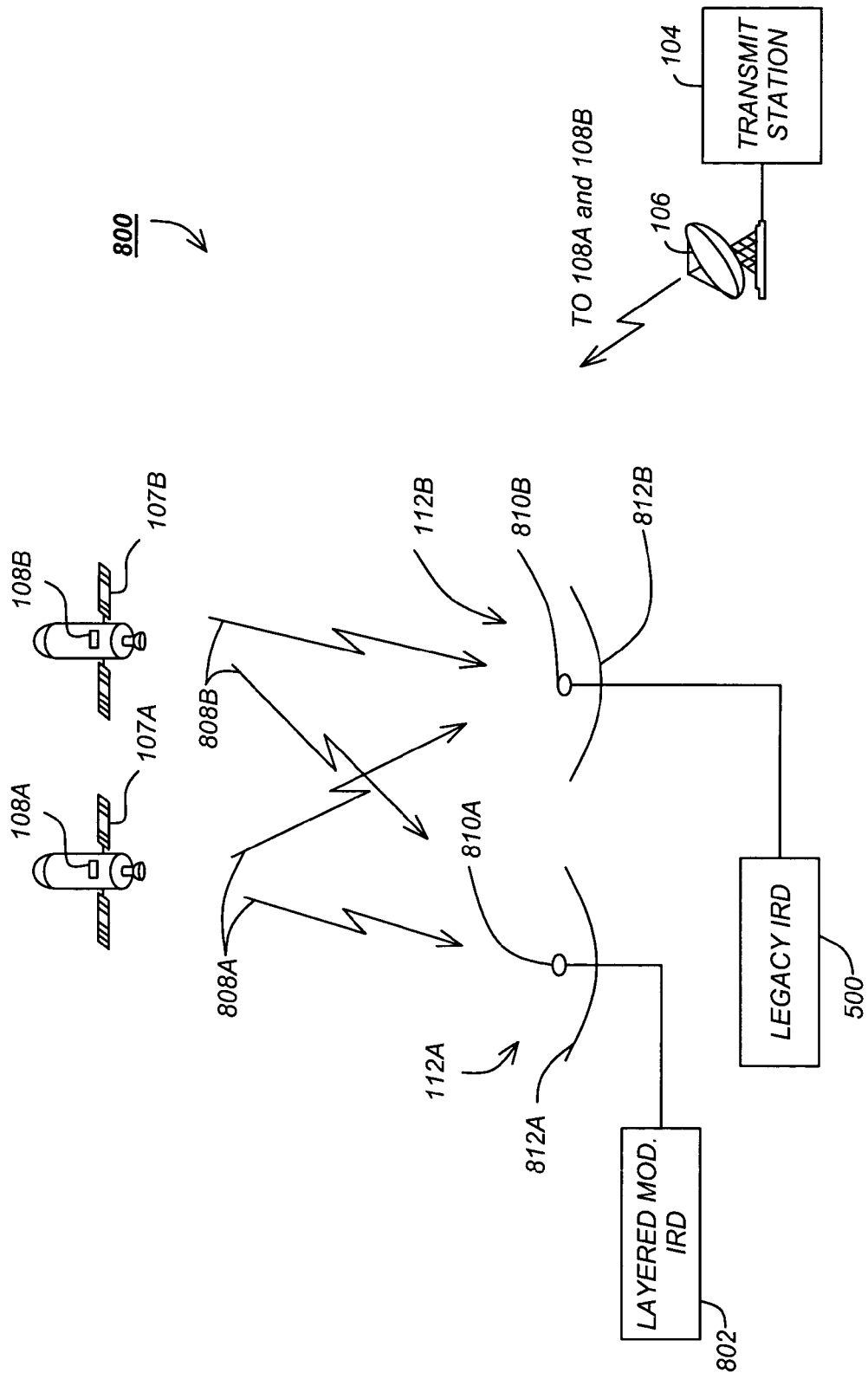
FIG. 8 is a diagram showing a system for transmitting and receiving layered modulation signals.

FIG. 8 is a diagram showing a system for transmitting and receiving layered modulation signals. Separate transmitters 107A, 107B, as may be located on any suitable platform, such as satellites 108A, 108B, are used to non-coherently transmit different layers of a signal of the present invention. Uplink signals are typically transmitted to each satellite 108A, 108B from one or more transmitters 105 via an antenna 106. The layered signals 808A, 808B (downlink signals) are received at receiver antennas 112A, 112B, such as satellite dishes, each with a low noise block (LNB) 812A, 812B where they are then coupled to integrated receiver/decoders (IRDs) 500, 802. Because the signal layers may be transmitted non-coherently, separate transmission layers may be added at any time using different satellites 108A, 108B or other suitable platforms, such as ground based or high altitude platforms. Thus, any composite signal, including new additional signal layers will be backwards compatible with legacy receivers 500, which will disregard the new signal layers. To ensure that the signals do not interfere, the combined signal and noise level for the lower layer must be at or below the allowed noise floor for the upper layer.

Layered modulation applications include backwards compatible and non-backwards compatible applications. "Backwards compatible" in this sense, describes systems in which legacy receivers 500 are not rendered obsolete by the additional signal layer(s). Instead, even if the legacy receivers 500 are incapable of decoding the additional signal layer(s), they are capable of receiving the layered modulated signal and decoding the original signal layer. In these applications, the pre-existing system architecture is accommodated by the architecture of the additional signal layers. "Non-backwards compatible" describes a system architecture which makes use of layered modulation, but the modulation scheme employed is such that pre-existing equipment is incapable of receiving and decoding the information on additional signal layer(s).

The pre-existing legacy IRDs 500 decode and make use of data only from the layer (or layers) they were designed to receive, unaffected by the additional layers. However, as will be described hereafter, the legacy signals may be modified to optimally implement the new layers. The present invention may be applied to existing direct satellite services which are broadcast to individual users in order to enable additional features and services with new receivers without adversely affecting legacy receivers and without requiring additional signal frequency.

Demodulator and Decoder

Figure 9:
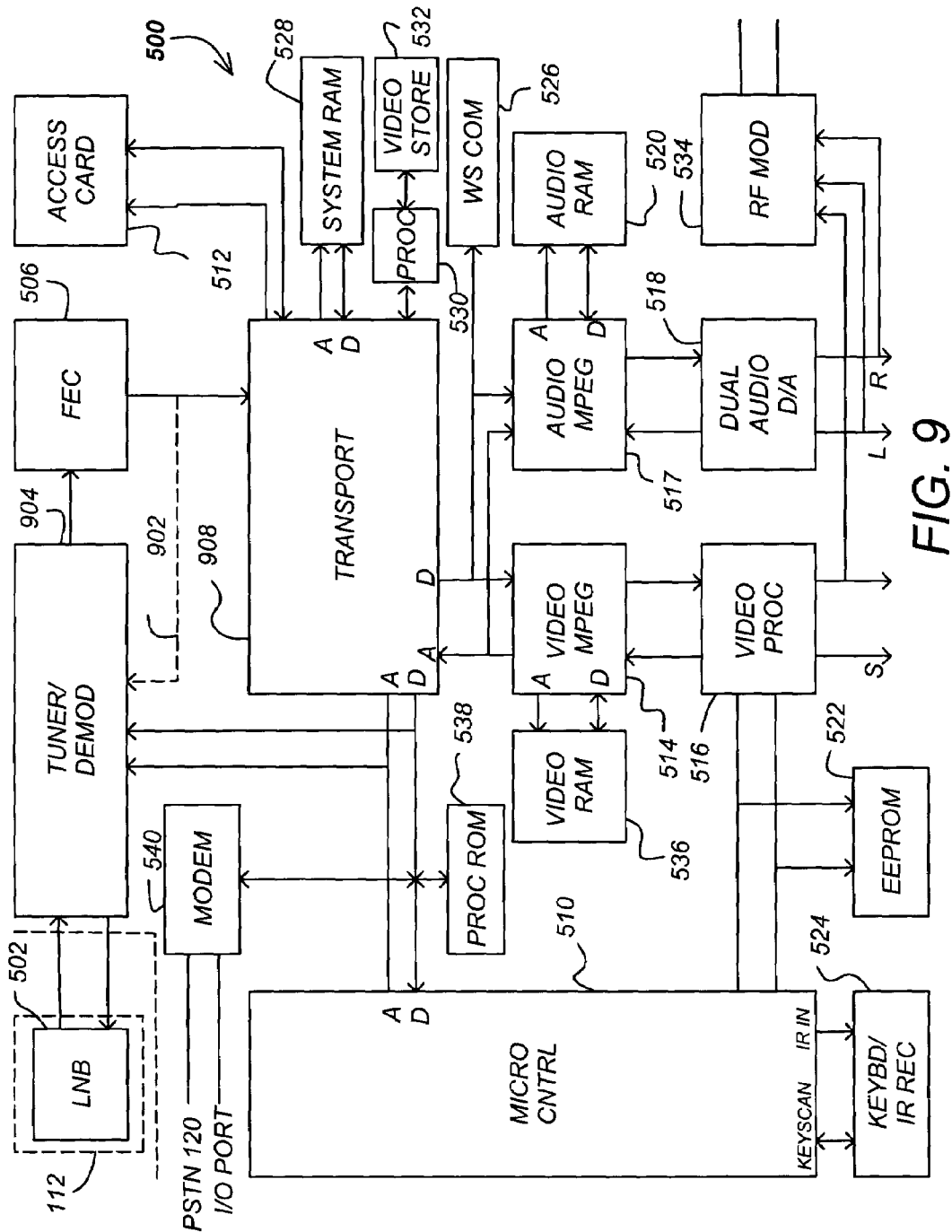
FIG. 9 is a block diagram depicting one embodiment of an enhanced receiver/decoder capable of receiving layered modulation signals.

FIG. 9 is a block diagram depicting one embodiment of an enhanced IRD 802 capable of receiving layered modulation signals. The enhanced IRD 802 includes a feedback path 902 in which the FEC decoded symbols are fed back to a enhanced modified tuner/demodulator 904 and transport module 908.

Figure 10A:
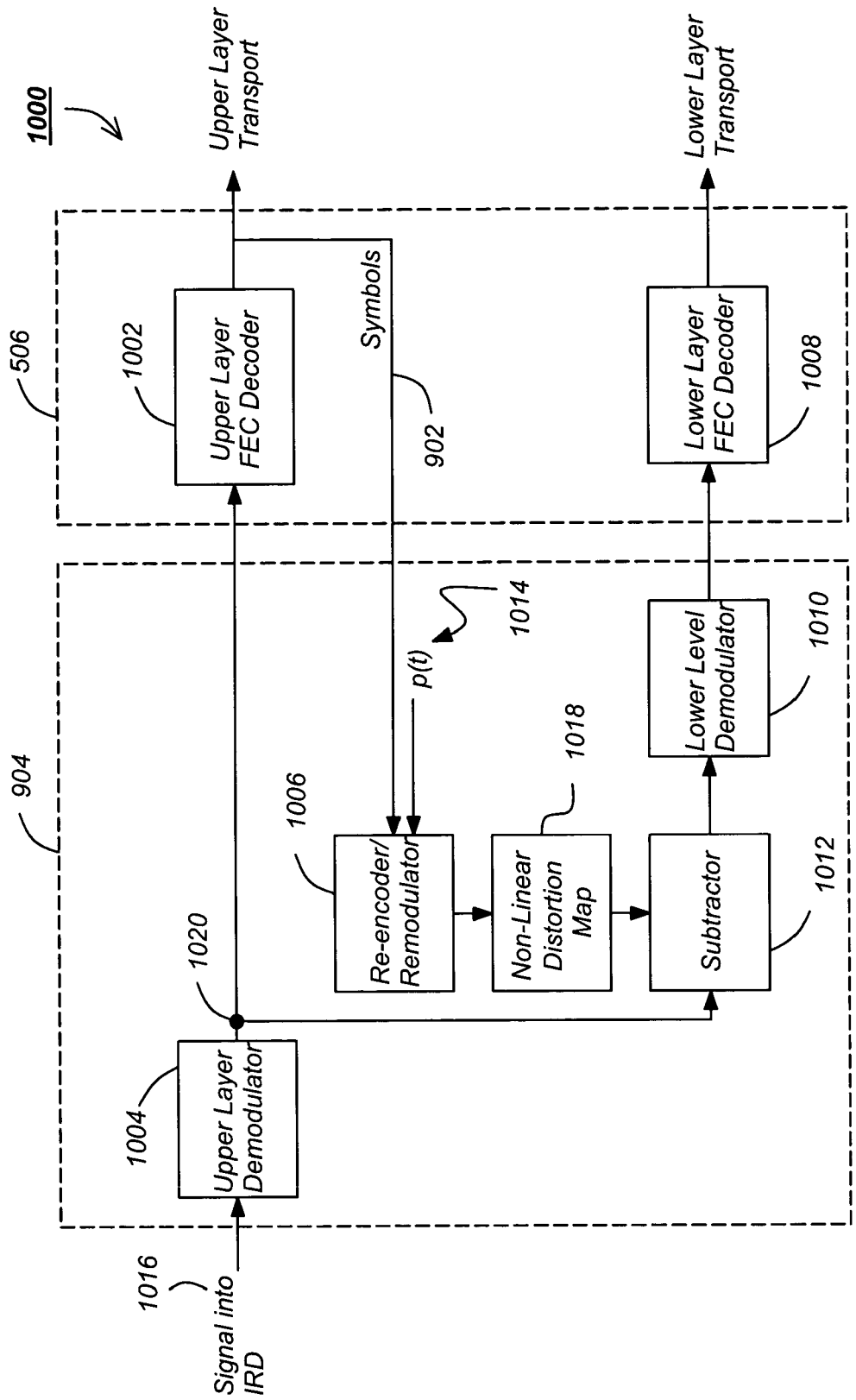
FIG. 10A is a block diagram of one embodiment of the enhanced tuner/modulator and FEC encoder.

FIG. 10A is a block diagram of one embodiment of the enhanced tuner/modulator 904 and FEC encoder 506. FIG. 10A depicts reception where layer subtraction is performed on a signal where the upper carrier has been demodulated. The upper layer of the received combined signal 1016 from the LNB 502, which may contain legacy modulation format, is provided to and processed by an upper layer demodulator 1004 to produce the stable demodulated signal 1020. The demodulated signal 1020 is fed to a communicatively coupled FEC decoder 1002 which decodes the upper layer to produce the upper layer symbols which are output to an upper layer transport. The upper layer symbols are also used to generate an idealized upper layer signal. The upper layer symbols may be produced from the decoder 1002 after Viterbi decode (BER<$10^{-3}$ or so) or after Reed-Solomon (RS) decode (BER<$10^{-9}$ or so), in typical decoding operations known to those skilled in the art. The upper layer symbols are provided via feedback path 902 from the upper layer decoder 1002 to a remodulator 1006 and then a module which applies the distortion that would be introduced by the satellite downlink network. This effectively produces an idealized upper layer signal. The idealized upper level signal is subtracted from the demodulated upper layer signal 1020.

In order for the subtraction to leave a clean lower layer signal, the upper layer signal must be precisely reproduced. The modulated signal may have been distorted, for example, by traveling wave tube amplifier (TWTA) non-linearity or other non-linear or linear distortions in the transmission channel. The distortion effects are estimated from the received signal after the fact or from TWTA characteristics which may be downloaded into the IRD in AM-AM and/or AM-PM maps 1014.

A subtractor 1012 then subtracts the idealized upper layer signal from the stable demodulated signal 1020. This leaves the lower-power second layer signal. The subtractor 1012 may include a buffer or delay function to retain the stable demodulated signal 1020 while the idealized upper layer signal is being constructed. The second layer signal is demodulated by the lower level demodulator 1010 and FEC decoded by decoder 1008 according to its signal format to produce the lower layer symbols, which are provided to a transport module similar to 508 but for the lower layer.

Figure 10B:
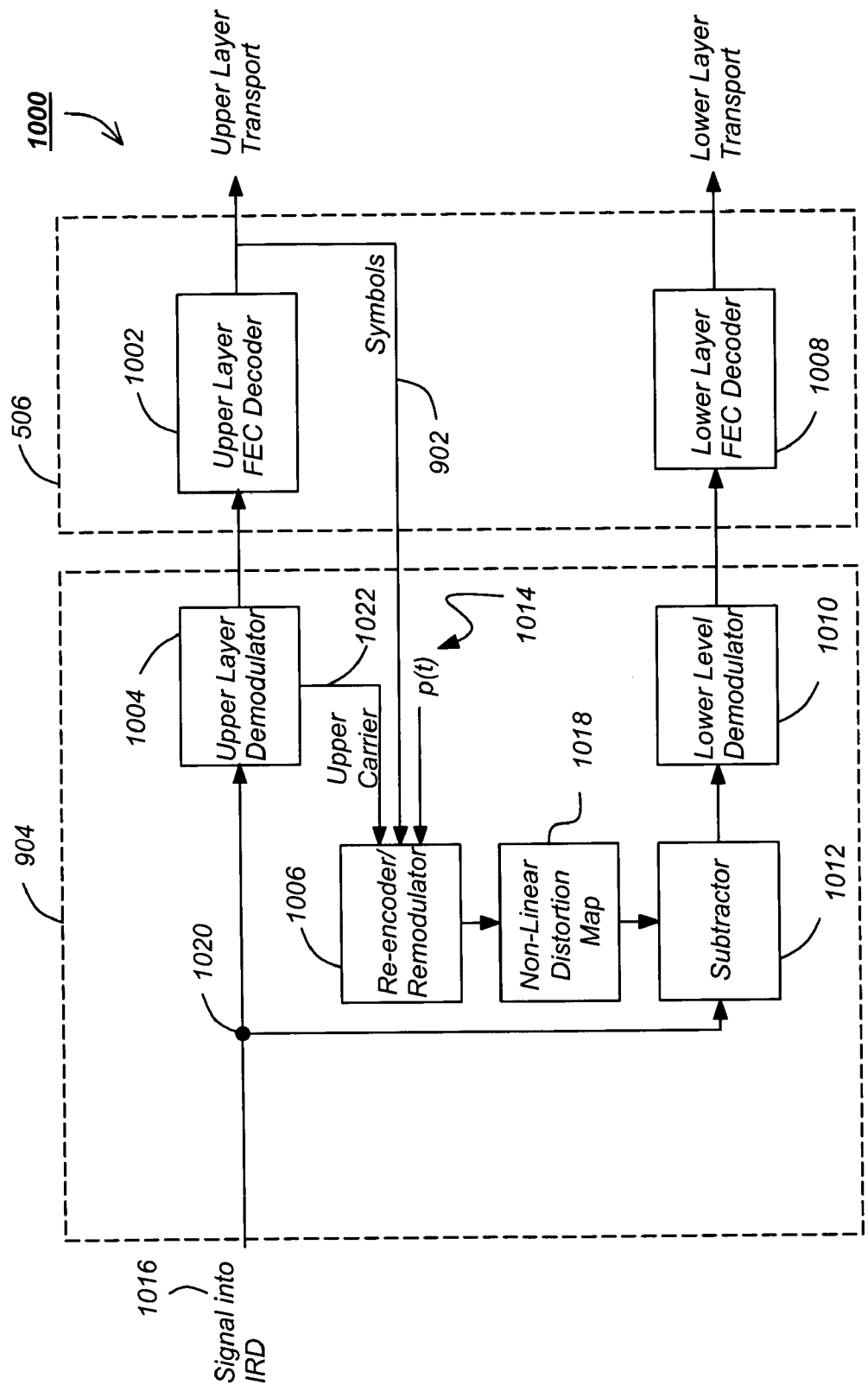
FIG. 10B depicts another embodiment of the enhanced tuner/modulator wherein layer subtraction is performed on the received layered signal.

FIG. 10B depicts another embodiment wherein layer subtraction is performed on the received layered signal. In this case, the upper layer demodulator 1004 produces the upper carrier signal 1022 . An upper carrier signal 1022 is provided to the remodulator 1006. The remodulator 1006 provides the remodulated signal to the non-linear distortion mapper 1018 which effectively produces an idealized upper layer signal. Unlike the embodiment shown in FIG. 10A, in this embodiment, the idealized upper layer signal includes the upper layer carrier for subtraction from the received combined signal 416.

Other equivalent methods of layer subtraction will occur to those skilled in the art and the present invention should not be limited to the examples provided here. Furthermore, those skilled in the art will understand that the present invention is not limited to two layers; additional layers may be included. Idealized upper layers are produced through remodulation from their respective layer symbols and subtracted. Subtraction may be performed on either the received combined signal or a demodulated signal. Finally, it is not necessary for all signal layers to be digital transmissions; the lowest layer may be an analog transmission.

The following analysis describes the exemplary two layer demodulation and decoding. It will be apparent to those skilled in the art that additional layers may be demodulated and decoded in a similar manner. The incoming combined signal is represented as:

$$s_{UL}(t) = f_U\left(M_U \exp(j\omega_U t + \theta_U) \sum_{m=-\infty}^{\infty} S_{Um} p(t - mT)\right) +$$

-continued $$f_L\left(M_L\exp(j\omega_L t+\theta_L)\sum_{m=-\infty}^{\infty}S_{Lm}p(t-mT+\Delta T_m)\right)+n(t)$$

where, $M_U$ is the magnitude of the upper layer QPSK signal and $M_L$ is the magnitude of the lower layer QPSK signal and $M_L<<M_U$. The signal frequencies and phase for the upper and lower layer signals are respectively $\omega_U$, $\theta_U$ and $\omega_U$, $\theta_U$, respectively. The symbol timing misalignment between the upper and lower layers is $\Delta T_m$. The expression p(t−mT) represents the time shifted version of the pulse shaping filter p(t) 430 employed in signal modulation. QPSK symbols $S_{Um}$ and $S_{Lm}$ are elements of $$\left\{\exp\left(j\frac{n\pi}{2}\right), n=0,1,2,3\right\}.$$

$f_U(\bullet)$ and $f_L(\bullet)$ denote the distortion function of the TWTAs for the respective signals.

Ignoring $f_U(\bullet)$ and $f_L(\bullet)$ and noise n(t), the following represents the output of the demodulator 1004 to the FEC decoder 1002 after removing the upper carrier:

$$s'_{UL}(t)=M_U\sum_{m=-\infty}^{\infty}S_{Um}p(t-mT)+$$
$$M_L\exp\{j(\omega_L-\omega_U)t+\theta_L-\theta_U\}\sum_{m=-\infty}^{\infty}S_{Lm}p(t-mT+\Delta T_m)$$

Because of the magnitude difference between $M_U$ and $M_L$, the upper layer decoder 402 disregards the $M_L$ component of the s'$_{UL}$(t).

After subtracting the upper layer from $s_{UL}$(t) in the subtractor 1012, the following remains:

$$s_L(t)=M_L\exp\{j(\omega_L-\omega_U)t+\theta_L-\theta_U\}\sum_{m=-\infty}^{\infty}S_{Lm}p(t-mT+\Delta T_m)$$

Any distortion effects, such as TWTA nonlinearity effects are estimated for signal subtraction. In a typical embodiment of the present invention, the upper and lower layer frequencies are substantially equal. Significant improvements in system efficiency can be obtained by using a frequency offset between layers.

Using the present invention, two-layered backward compatible modulation with QPSK doubles the current legacy system capacity that uses a legacy operating mode with a 6/7 FEC code rate. This capacity increase is enabled by transmitting a backward compatible upper layer carrier through a TWTA that is approximately 6.2 dB above the power used in the legacy system. The new lower layer QPSK signals may be transmitted from a separate transmitter, or from a different satellite for example.

Systems using 16QAM modulation could be designed to provide similar transmission capacity, but this modulation format requires reasonably linear transmitting amplifiers. With layered modulation, separate amplifiers can be used for each layer, and if QPSK signals are used for these layers then these amplifiers can be used in a more efficient non-linear mode. Thus layered modulation eliminates the need for less efficient linear travelling wave tube amplifiers (TWTAs) as are needed for 16QAM. Also, no phase error penalty is imposed on higher order modulations such as 8PSK and 16QAM.

Backward Compatible Applications

Figure 11A:
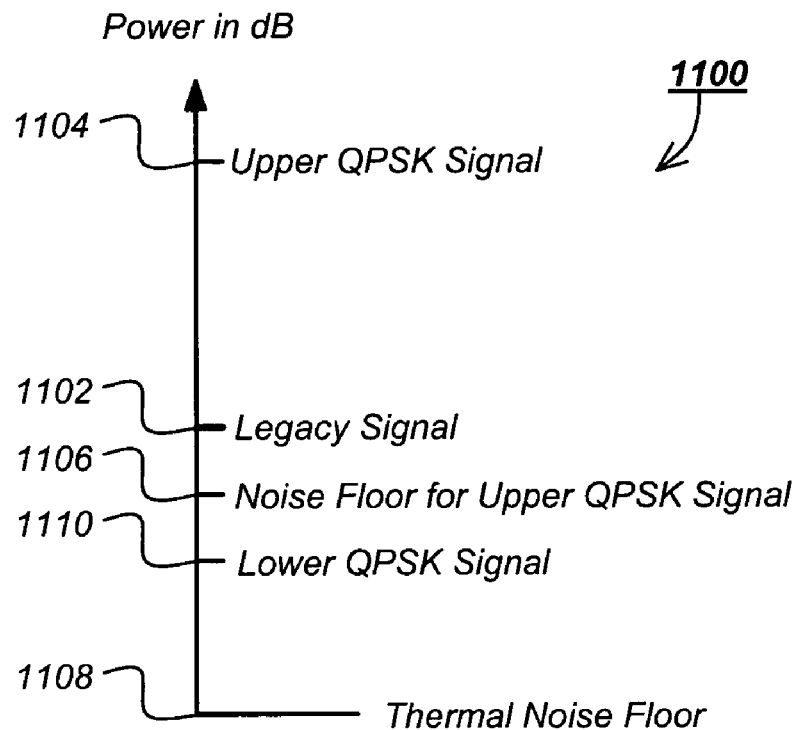
FIGS. 11A and 11B depict the relative power levels of example embodiments of the present invention.

FIG. 11A depicts the relative power levels 1100 of example embodiments of the present invention. FIG. 11A is not a scale drawing. This embodiment doubles the pre-existing rate 6/7 capacity by using a TWTA 6.2 dB above a pre-existing TWTA equivalent isotropic radiated power (EIRP) and second TWTA 2 dB below the pre-existing TWTA power. This embodiment uses upper and lower QPSK layers which are non-coherent. A code rate of 6/7 is also used for both layers. In this embodiment, the signal of the legacy QPSK signal 1102 is used to generate the upper layer 1104 and a new QPSK layer is the lower layer 1110. The CNR of the legacy QPSK signal 1102 is approximately 7 dB. In the present invention, the legacy QPSK signal 1102 is boosted in power by approximately 6.2 dB bringing the new power level to approximately 13.2 dB as the upper layer 1104. The noise floor 1106 of the upper layer is approximately 6.2 dB. The new lower QPSK layer 1110 has a CNR of approximately 5 dB. The total signal and noise of the lower layer is kept at or below the tolerable noise floor 1106 of the upper layer. The power boosted upper layer 1104 of the present invention is also very robust, making it resistant to rain fade. It should be noted that the invention may be extended to multiple layers with mixed modulations, coding and code rates.

In an alternate embodiment of this backwards compatible application, a code rate of 2/3 may be used for both the upper and lower layers 1104, 1110. In this case, the CNR of the legacy QPSK signal 1102 (with a code rate of 2/3) is approximately 5.8 dB. The legacy signal 1102 is boosted by approximately 5.3 dB to approximately 11.1 dB (4.1 dB above the legacy QPSK signal 1102 with a code rate of 2/3) to form the upper QPSK layer 1104. The new lower QPSK layer 1110 has a CNR of approximately 3.8 dB. The total signal and noise of the lower layer 1110 is kept at or below approximately 5.3 dB, the tolerable noise floor 1106 of the upper QPSK layer. In this case, overall capacity is improved by 1.55 and the effective rate for legacy IRDs will be 7/9 of that before implementing the layered modulation.

In a further embodiment of a backwards compatible application of the present invention the code rates between the upper and lower layers 1104, 1110 may be mixed. For example, the legacy QPSK signal 502 may be boosted by approximately 5.3 dB to approximately 12.3 dB with the code rate unchanged at 6/7 to create the upper QPSK layer 1104. The new lower QPSK layer 1110 may use a code rate of 2/3 with a CNR of approximately 3.8 dB. In this case, the total capacity relative to the legacy signal 1102 is approximately 1.78. In addition, the legacy IRDs will suffer no rate decrease.

Non-Backward Compatible Applications

As previously discussed the present invention may also be used in "non-backward compatible" applications. In a first example embodiment, two QPSK layers 1104, 1110 are used each at a code rate of 2/3. The upper QPSK layer 504 has a CNR of approximately 4.1 dB above its noise floor 1106 and the lower QPSK layer 1110 also has a CNR of approximately 4.1 dB. The total code and noise level of the lower QPSK layer 1110 is approximately 5.5 dB. The total CNR for the upper QPSK signal 1104 is approximately 9.4 dB, merely 2.4 dB above the legacy QPSK signal rate 6/7. The capacity is approximately 1.74 compared to the legacy rate 6/7.

Figure 11B:
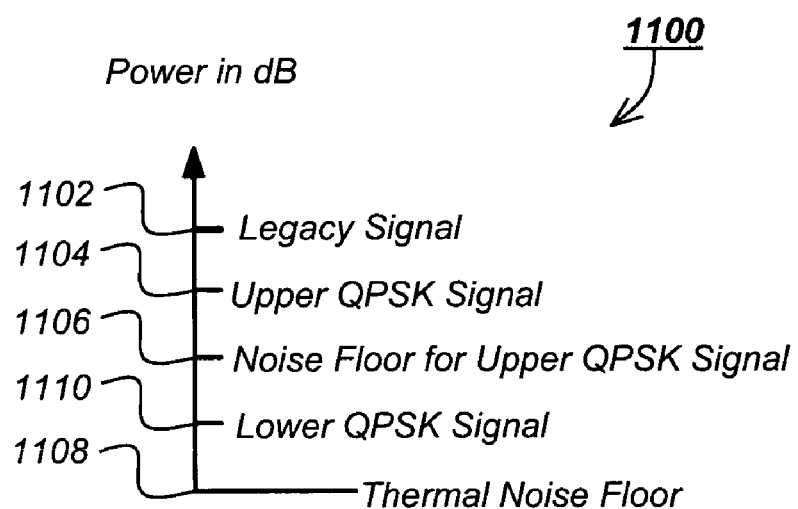

FIG. 11B depicts the relative power levels of an alternate embodiment wherein both the upper and lower layers 1104, 1110 are below the legacy signal level 1102. The two QPSK layers 1104, 1110 use a code rate of 1/2. In this case, the upper QPSK layer 1104 is approximately 2.0 dB above its noise floor 1106 of approximately 4.1 dB. The lower QPSK layer has a CNR of approximately 2.0 dB and a total code and noise level at or below 4.1 dB. The capacity of this embodiment is approximately 1.31 compared to the legacy rate 6/7.

Fast Acquisition of Timing and Carrier Frequency

Figure 12:
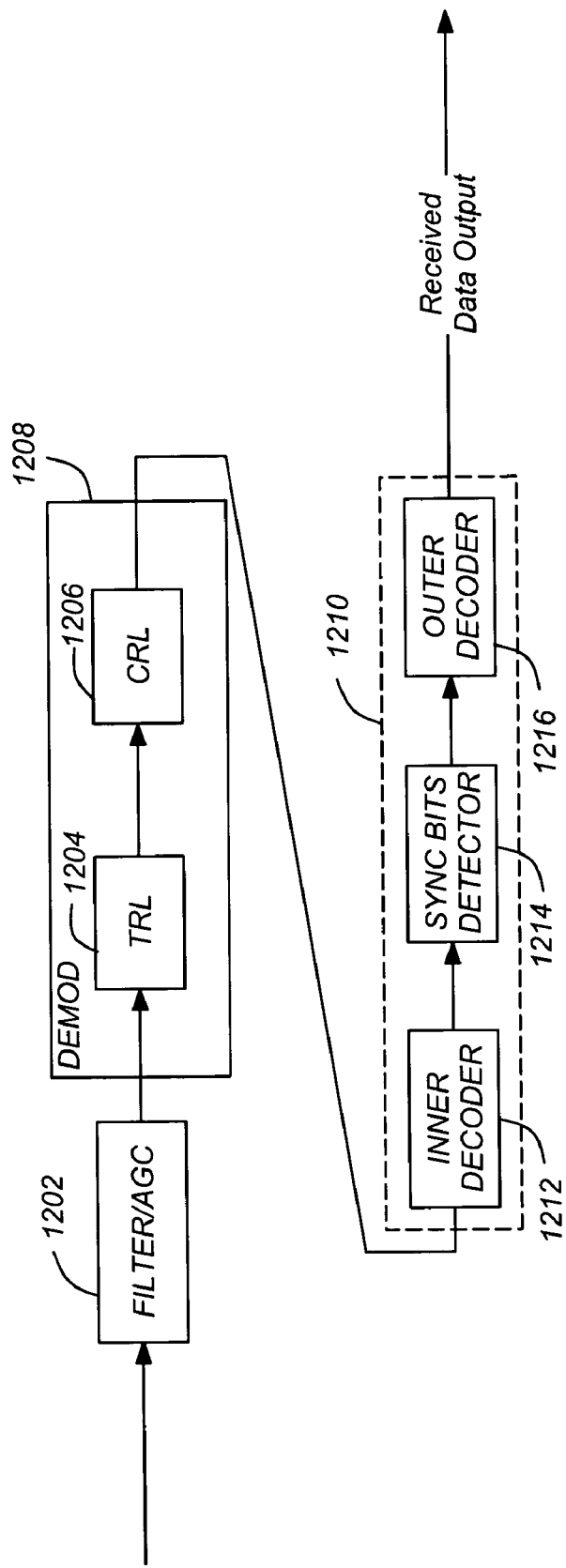
FIG. 12 is a diagram showing an overview of the reception of a data signal.

FIG. 12 is a diagram showing an overview of an example of the reception of a data signal. The input signal is accepted, and provided to a filter/AGC element 1202. The resulting signal is provided to a demodulator 1208 having a TRL module 1204 for recovering the symbol timing of the signal and a CRL module 1206 for recovering the carrier. Since the input symbols are typically encoded before transmission to reduce errors, the demodulated signal must be decoded by decoder 1210. In the illustrated embodiment, the decoder 1210 includes an inner decoder 1212, a synchronization bit detector 1214, and an outer decoder 1216.

Figure 13:
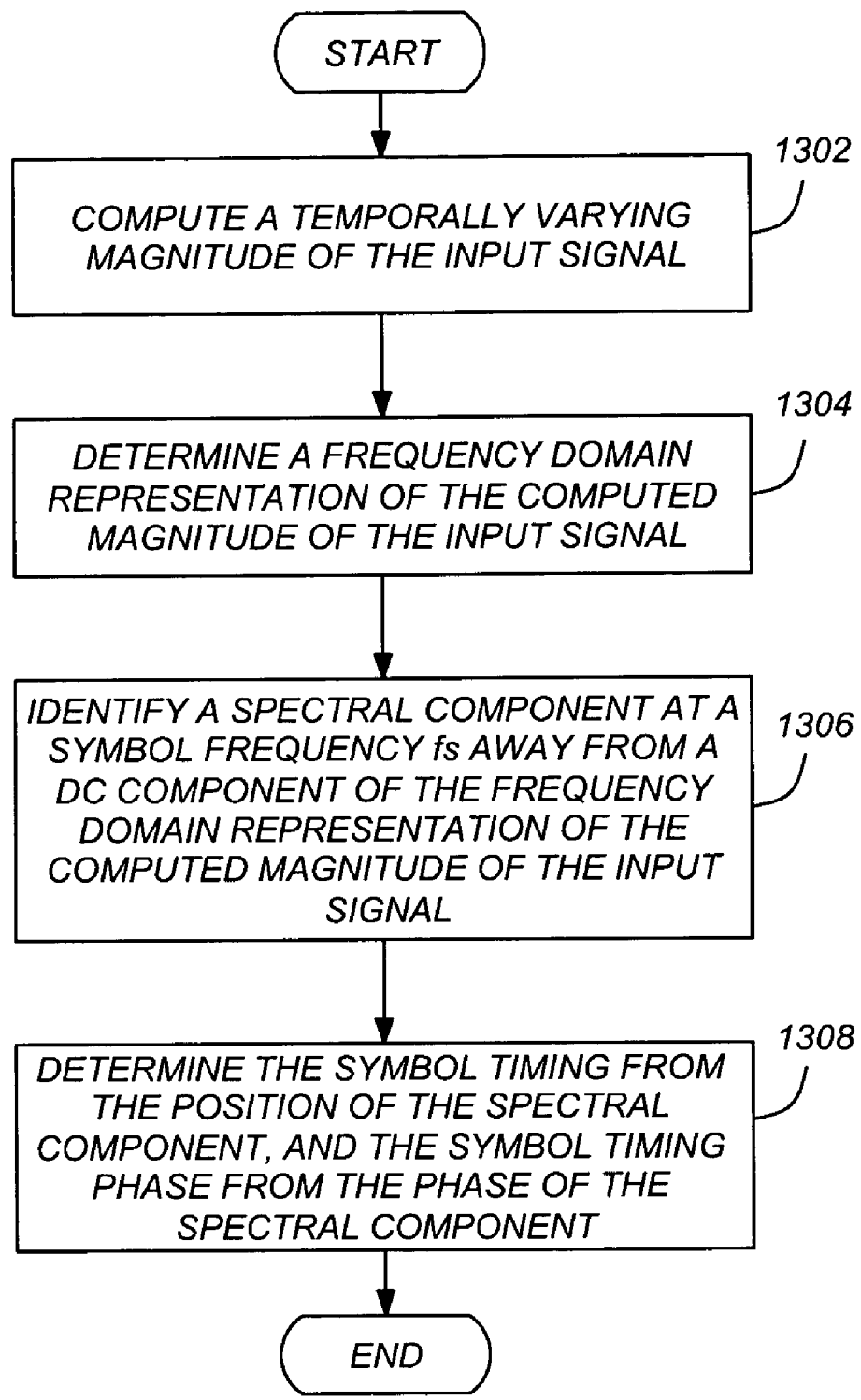
FIG. 13 is a diagram presenting an exemplary technique for practicing one embodiment of the present invention.
Figure 14A:
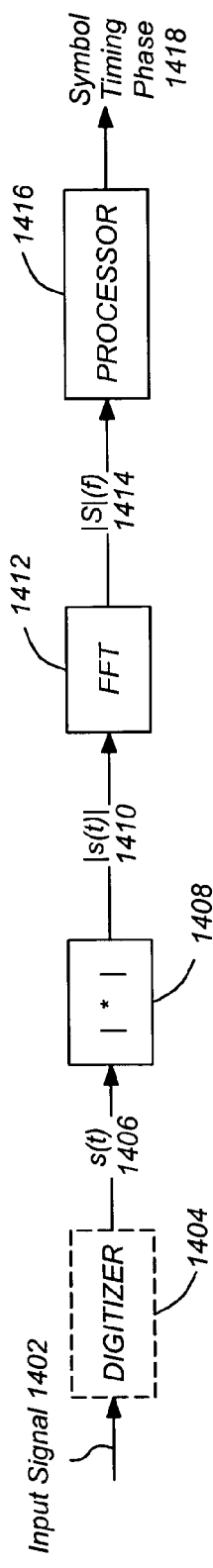
FIGS. 14A–14C are diagrams illustrating an application of the technique described in FIG. 13.
Figure 14B:
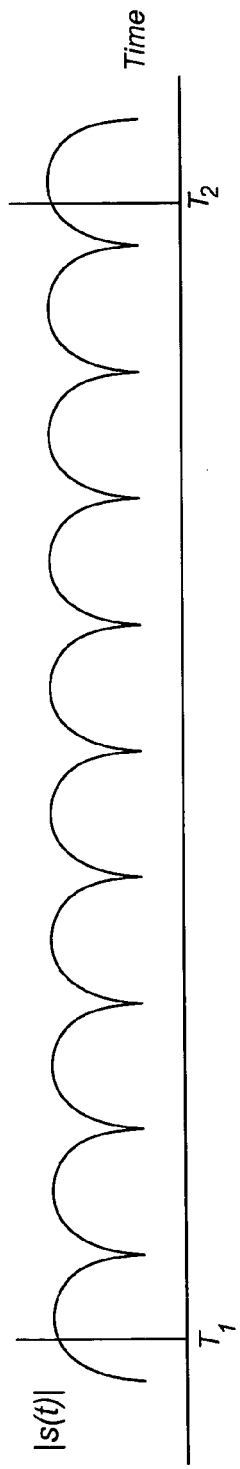

FIG. 13 is a diagram presenting an exemplary technique for practicing one embodiment of the present invention. FIG. 13 will be discussed with reference to FIGS. 14A–14C, which are diagrams illustrating an application of the technique described in FIG. 13. Referring first to FIG. 13, the magnitude of a temporally varying input signal is computed, as shown in block 1302. This can be accomplished by applying the input signal 1402 to an optional digitizer 1404 to provide signal s(t) 1406, and providing s(t) 1406 to a processor module 1408 to determine the computed magnitude of the input signal |s(t)| 1410, which is illustrated in FIG. 14B. The processor module 1408 can be a simple electronic circuit or a digital microprocessor. A frequency-domain representation of the resulting signal |s(t)| 1410 is then determined (resulting in |S|(f) 1414, as shown in block 1304. This can be accomplished by a fast Fourier transform (FFT) using FFT module 1412. The FFT module 1412 is typically implemented by a processor responding to software instructions, but can be a hardware module as well.

Figure 14C:
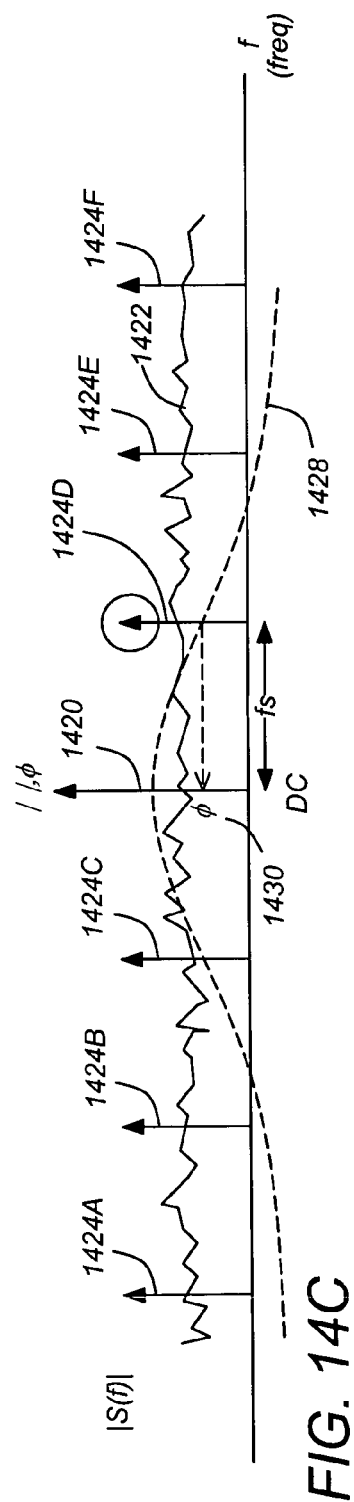

FIG. 14C is a diagram illustrating the frequency domain representation of |S|(f) 1414, including the magnitude |*| indicated by the solid line and simplified phase φ 1428 indicated by the dashed line. |S|(f) 1414 includes a noise component 1422 a DC (time-invariant) component 1420, and a plurality of spectral components 1424A–1424F, each spaced by the symbol frequency $f_s$. Next, the spectral component at a symbol frequency $f_s$ 1424D away from the DC component 1420 is identified, as shown in block 1306. The symbol timing frequency estimate is determined from the distance of the identified spectral component from DC. The symbol timing phase estimate is determined from the phase φ of the identified spectral component 1424D, as shown in block 1308.

Figure 15A:
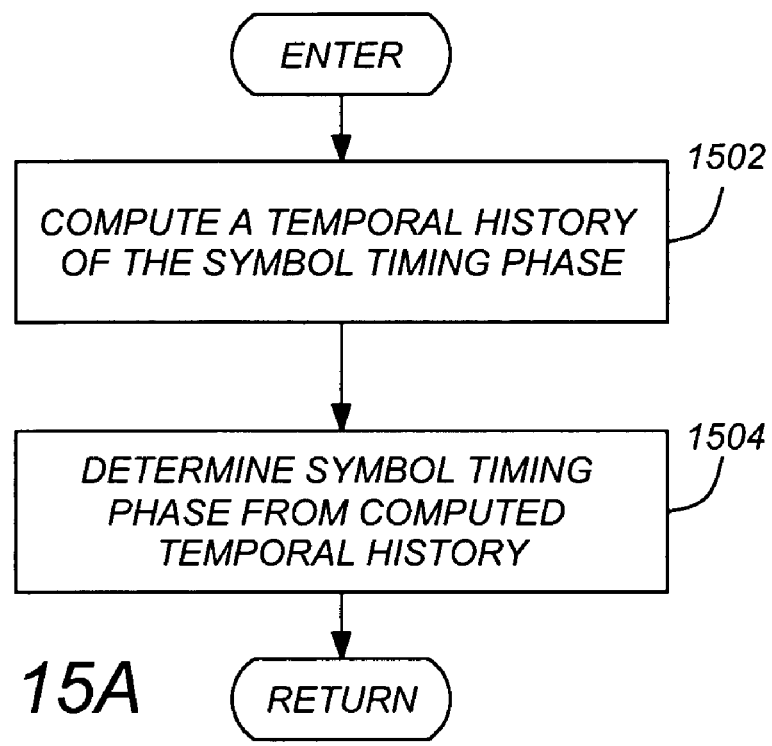
FIG. 15A is a diagram presenting an exemplary technique for improving the estimate of the symbol timing.

FIG. 15A is a diagram presenting an exemplary technique for improving the estimate of the symbol timing. As shown in block 1502, this is accomplished by computing a temporal history of the symbol timing determined in block 1308. The refined symbol timing phase is then determined from this temporal timing phase history, as shown in block 1504. This can be a simple average of the computed phase values over a period of time, or can be computed using more complex techniques, including parameter estimation and optimal filtering techniques.

Figure 15B:
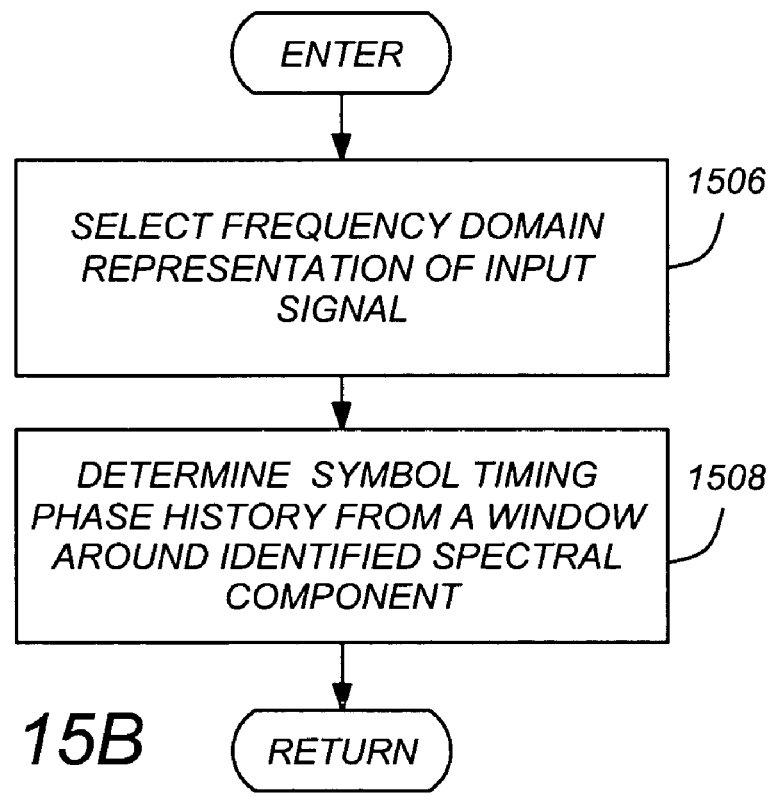
FIG. 15B is a diagram presenting another embodiment of the technique for improving the estimate of the symbol timing.
Figure 16A:
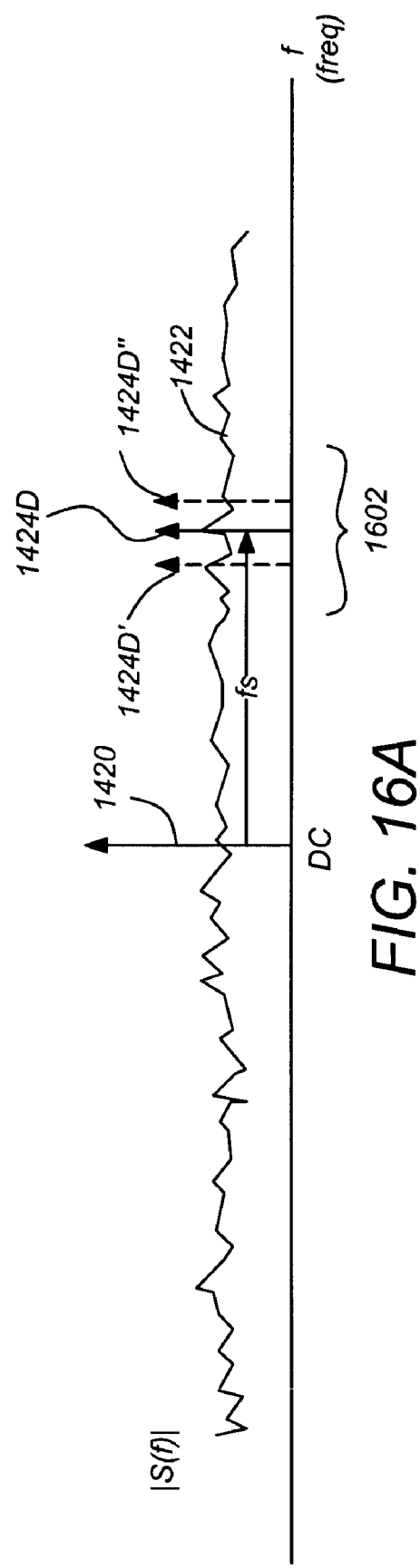
FIGS. 16A and 16B are diagrams illustrating how the estimate of the symbol timing can be improved.
Figure 16B:
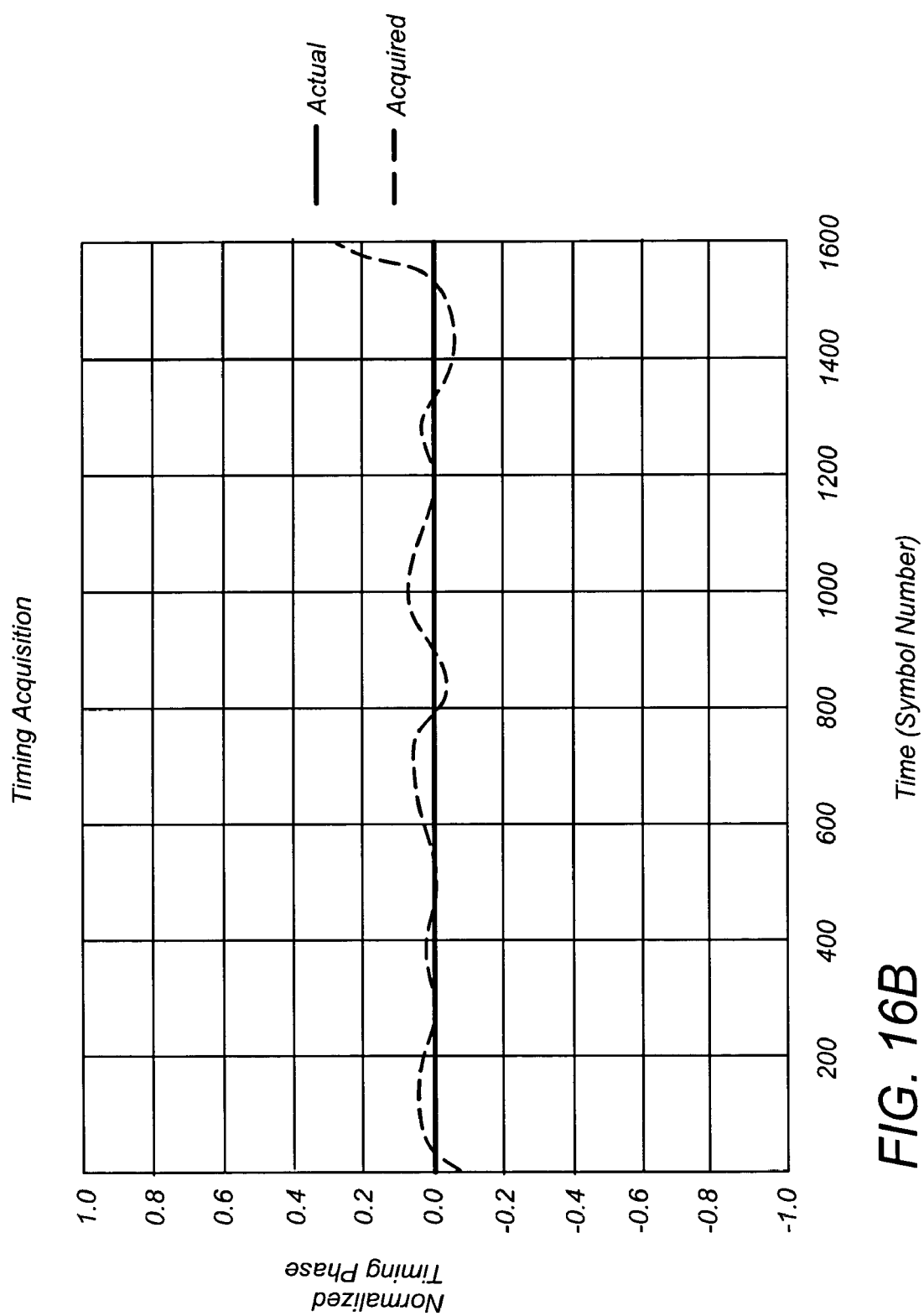

FIG. 15B is a diagram presenting an exemplary technique for determining the symbol timing phase history within an observation time interval. FIG. 15 is discussed with reference to FIGS. 16A and 16B, which illustrate how the estimate of the symbol timing phase history can be obtained. As shown in block 1506, a frequency domain representation of the signal is selected. Then, a symbol timing phase history is determined from a window 1602 around the an identified spectral component of the selected frequency domain representation, as shown in block 1508. FIG. 16A illustrates spectral component 1424D, and a frequency window 1602 in which the time domain representation is obtained. FIG. 16B presents the estimated timing phase history in the form of an inverse Fourier transform of the spectral component around 1424D. This is represented by $F^{-1}[|S|(f)]$. Note that since the spectral component 1424D can change due to symbol timing jitter, manifesting adjacent spectral components 1424D', 1424D'', etc. The motion of this spectral component is likewise manifested in the estimated timing phase history computed from $F^{-1}[|S|(f)]$ shown in FIG. 16B.

Figure 17A:
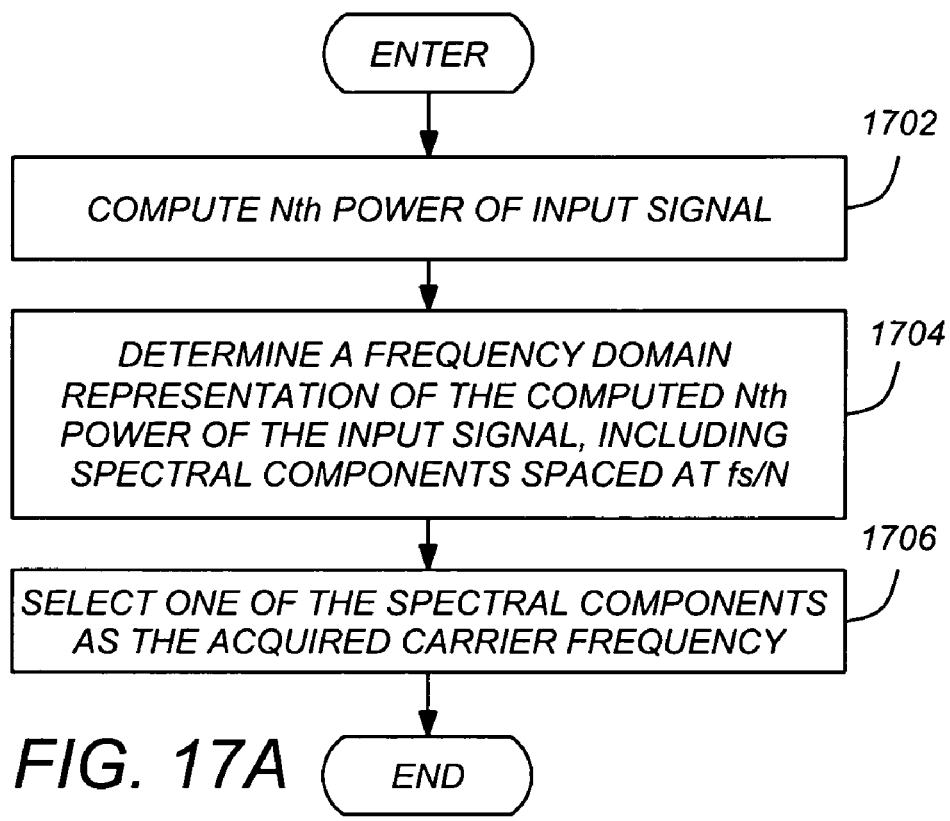
FIG. 17A is a diagram depicting an exemplary technique for improving the estimate of the carrier frequency.
Figure 18A:
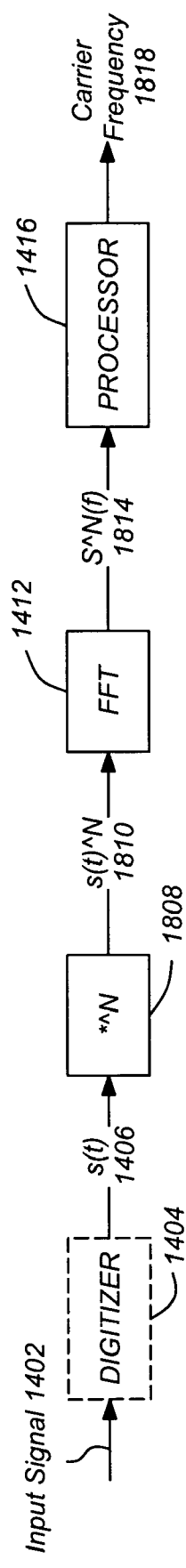
FIGS. 18A–18B are diagrams depicting an application of the technique described in FIG. 17A.

FIG. 17A is a diagram presenting an exemplary technique for improving an estimate of the carrier frequency. FIG. 17A is discussed with reference to FIGS. 18A–18C, which are diagrams illustrating an application of the technique described in FIG. 17A. Referring to FIG. 17A, the input signal 1402 is optionally digitized by digitizer 1404, and the resulting signal, s(t) 1406, is provided to a processor module 1808. The processor module 1808 produces the $N^{th}$ power of the complex input signal, or $(s(t))^N$ 1810 (for notational simplicity, this value is illustrated in FIGS. 18A–18C as s(t)^N.

If the input signal is modulated by QPSK or nQAM, N is selected to be four. If the input signal is modulated by nPSK, N is preferably selected to be n. In layered modulation schemes, for example, if the input signal includes a QPSK modulated first input signal representing the upper layer and a QPSK modulated second signal representing the lower layer, N is set to four in the demodulators for the two layers.

Figure 18B:
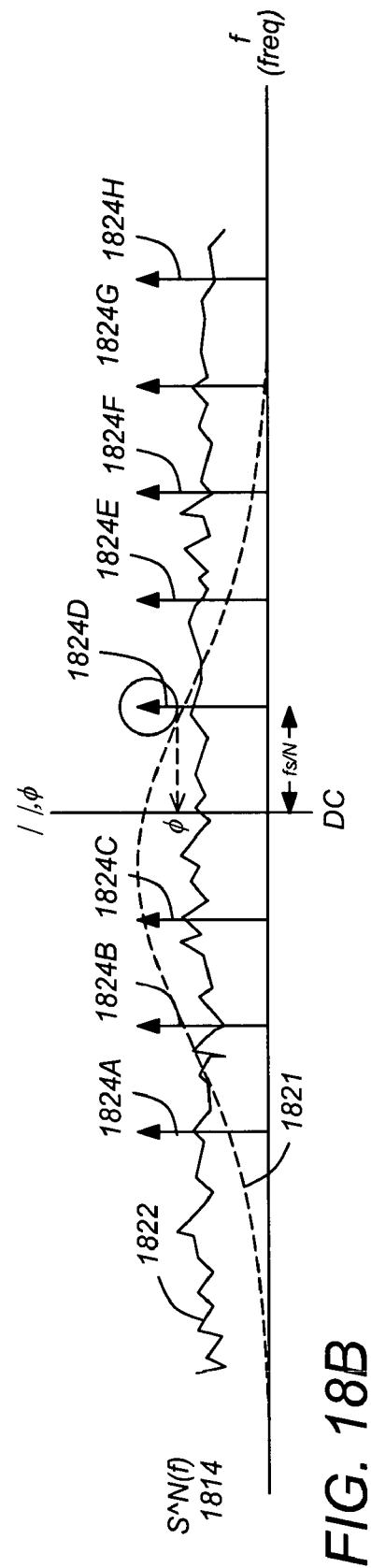
Figure 18C:
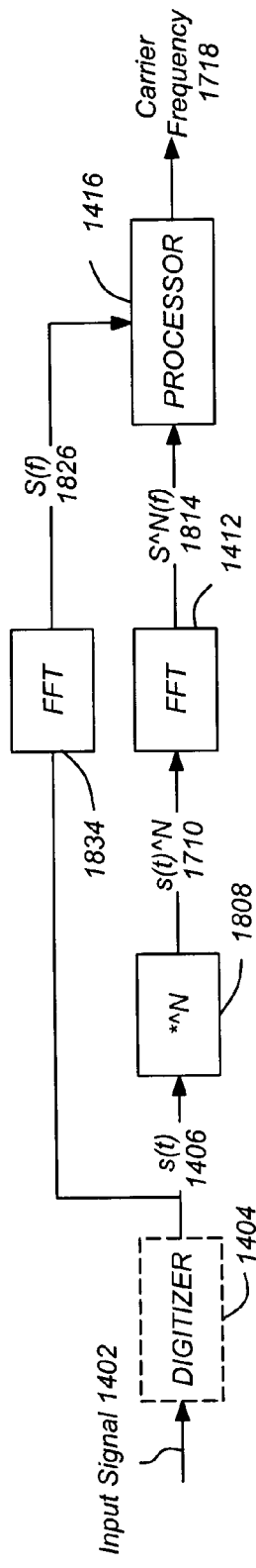
FIGS. 18C–18D are diagrams depicting an application of the technique described in FIG. 17B.

FIG. 18B is a plot showing an example of the form of $(s(t))^N$ 1810. The processor module 1808 can be implemented by a hardware circuit or by a digital processor performing operations on the input provided thereto. A frequency domain representation of the computed $N^{th}$ power of the input signal s(t) 1406 is then determined, yielding $S^N(f)$ 1814 (illustrated as S^N(f) for notational simplicity), as shown in block 1704. In the embodiment shown in FIG. 18A, this is accomplished by a Fourier transform module 1412, which implements a FFT or similar process.

FIG. 18B is a diagram showing the frequency domain representation of the computed $N^{th}$ power of the input signal , $S^N(f)$ 1814. The frequency domain representation $S^N(f)$ 1814 includes a plurality of spectral components 1824A–1824H above residual noise 1822 and spaced apart in frequency by the symbol frequency (or baud rate) $f_s$ divided by N. The frequency domain representation also includes a phase simply represented by dashed line 1821. For a QPSK signal with a 20 MHz symbol frequency, the components 1824A–1824H are spaced by 5 MHz. Components 1824A–1824H represent a frequency-ambiguous solution to the determination of the carrier frequency. That is, one of these spectral components 1824A–1824H is the acquired carrier frequency $f_c$, and is selected such as shown in block 1706. The carrier phase is determined from the phase φ of the selected component. However, because there is frequency ambiguity with regard to the carrier frequency, it remains to determine which of the spectral components 1824A–1824H represents the actual carrier frequency. As described below, the spectral component in 1824A–1824H at the frequency associated with the greatest input signal s(t) 1406 energy is the component that is at the carrier frequency $f_c$. Therefore, the frequency ambiguity can be eliminated by determining the spectral power of the input signal integrated over a spectral window with a width equal to the signal spectrum and centered at each of the candidate spectral components 1824A–1824H.

Figure 17B:
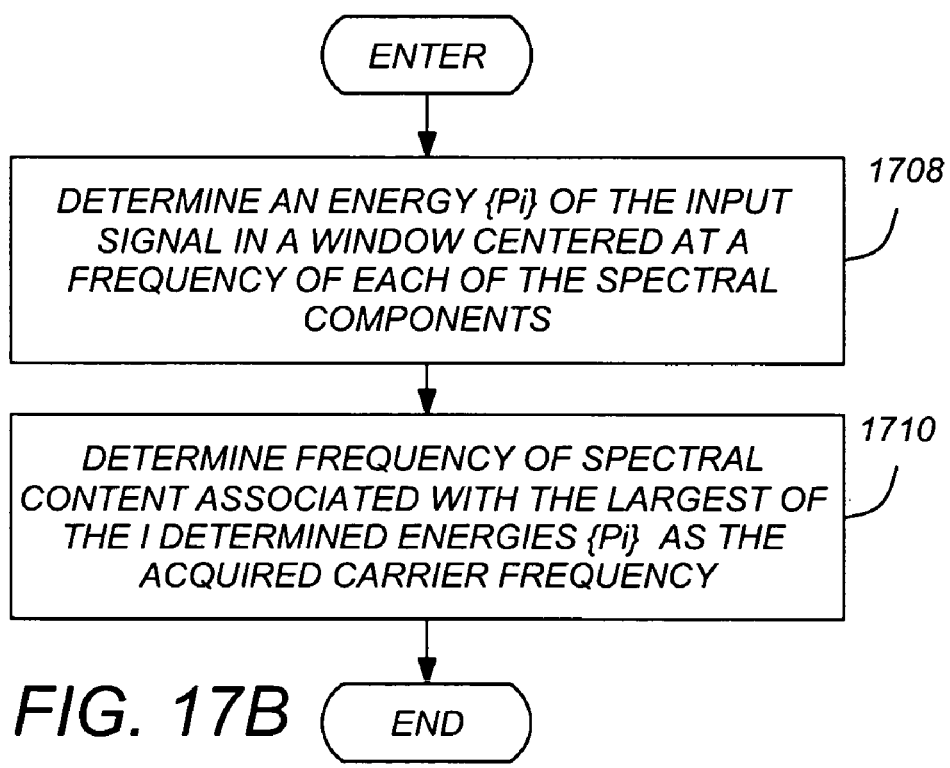
FIG. 17B is a diagram presenting an exemplary technique for determining which of the spectral components are selected as the acquired carrier frequency.
Figure 18D:
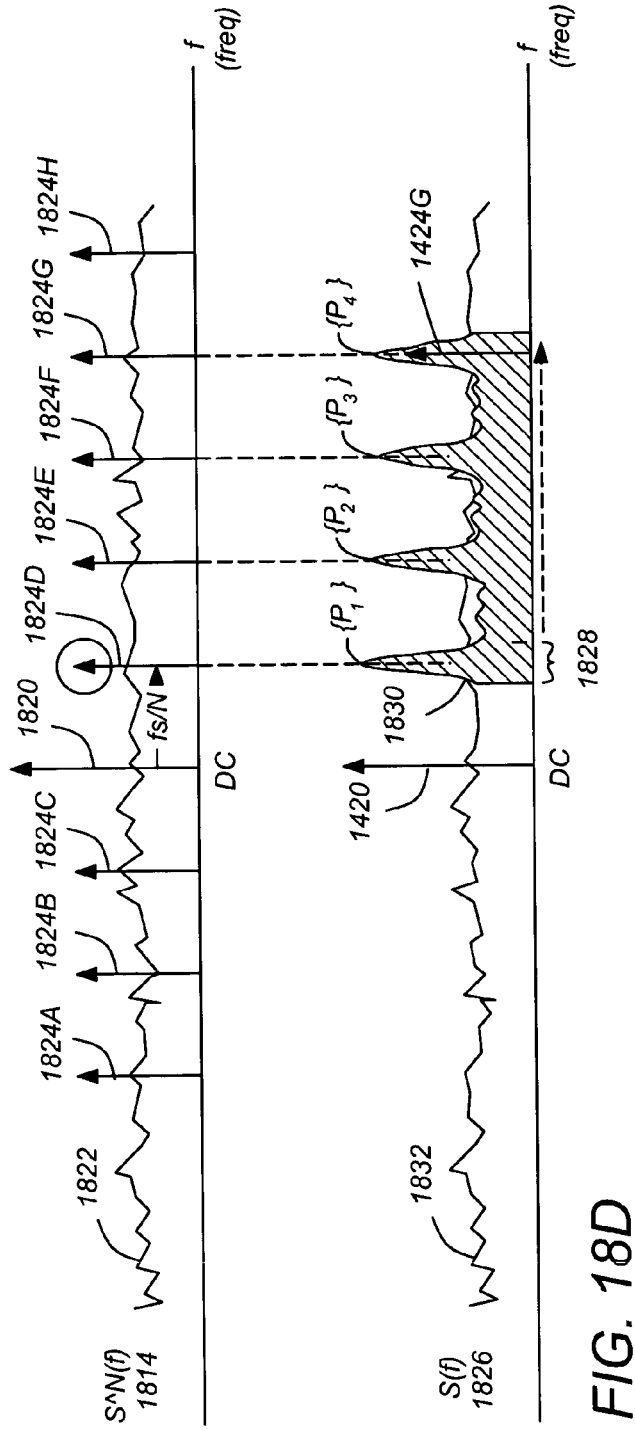

FIG. 17B is a diagram presenting an exemplary technique for determining which of the spectral components is selected as the acquired carrier frequency $f_c$. FIG. 17B is discussed with reference to FIGS. 18C and 18D, which are diagrams illustrating an application of the technique described in FIG. 17B. As shown in block 1708, an energy or power $\{P_i\}$ of the input signal s(t) 1406 in a frequency window 1828 centered at the frequency of each of the spectral components 1824A–1824H is determined. This can be accomplished by generating a frequency-domain representation of the input signal s(t) 1406, using, for example, FFT module 1834, and providing the resulting spectrum S(f) 1826 to processor 1416. Processor 1416 integrates the power of the spectrum of the input signal s(t) 1406 in the frequency window 1828 about the candidate frequencies. Although shown as narrower for illustrative purposes, window 1828 preferably spans about five times the bandwidth described by the spacing of the components 1824. This results in integrated power values $\{P_1\},\{P_2\},\ldots,\{P_i\}$. As shown in block 1710, the frequency associated with the largest of the i determined energies $\{P_i\}$ is selected as the acquired carrier frequency $f_c$. In the example illustrated in FIG. 18D, energy plot 1830 includes four peaks $\{P_1\},\{P_2\},\{P_3\},\{P_4\}$. Since peak $\{P_1\}$ has the greatest energy or power, the frequency of the associated spectral component, labeled 1824D, is chosen as the carrier frequency. Once the carrier frequency is determined, the carrier phase can be determined from the phase of the selected spectral component.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. For example, it is noted that the uplink configurations depicted and described in the foregoing disclosure can be implemented by one or more hardware modules, one or more software modules defining instructions performed by a processor, or a combination of both.

It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of determining symbol timing in an input signal, comprising the steps of:

computing a temporally varying magnitude of the input signal;

determining a frequency domain representation of the computed magnitude of the input signal;

identifying a spectral component at a symbol frequency $f_s$ away from a DC component of the frequency domain representation of the computed magnitude of the input signal, the spectral component having a magnitude and a phase; and determining the symbol timing phase of the input signal from the phase of the spectral component.

2. The method of claim 1, wherein the step of determining a frequency domain representation of the computed magnitude of the input signal comprises the steps of:

performing a fast Fourier transform (FFT) of the computed magnitude of the input signal.

3. The method of claim 1, wherein the step of determining the symbol timing phase of the input signal from the phase of the spectral component comprises the steps of:

computing a temporal history of the symbol timing phase of the input signal and computing the symbol timing phase of the input signal from the temporal history of the symbol timing phase of the input signal.

4. The method of claim 3, wherein the steps of computing a temporal history of the symbol timing phase of the input signal and computing the symbol timing phase of the input signal from the temporal history of the symbol timing phase of the input signal comprise the steps of:

determining a time domain representation of the frequency domain representation of the computed magnitude of the input signal in a window around the identified spectral component;

determining the symbol timing phase of the input signal from the time domain representation.

5. The method of claim 4, wherein a width of the window is selected according to a jitter of the symbol timing in the input signal.

6. An apparatus for determining symbol timing in a input signal, comprising:

means for computing a temporally varying magnitude of the input signal;

means for determining a frequency domain representation of the computed magnitude of the input signal;

means for identifying a spectral component at a symbol frequency $f_s$ away from a DC component of the frequency domain representation of the computed magnitude of the input signal, the spectral component having a magnitude and a phase; and means for determining the symbol timing phase of the input signal from the phase of the spectral component.

7. The apparatus of claim 6, wherein the means for determining a frequency domain representation of the computed magnitude of the input signal comprises:

means for performing a fast Fourier transform (FFT) of the computed magnitude of the input signal.

8. The apparatus of claim 6, wherein the means for determining the symbol timing phase of the input signal from the phase of the spectral component comprises:

means for computing a temporal history of the symbol timing phase of the input signal and computing the symbol timing phase of the input signal from the temporal history of the symbol timing phase of the input signal.

9. The apparatus of claim 8, wherein the means for computing a temporal history of the symbol timing phase of the input signal and computing the symbol timing phase of the input signal from the temporal history of the symbol timing phase of the input signal comprises:

means for determining a further frequency domain representation of the frequency domain representation of the computed magnitude of the input signal in a window around the identified spectral component;

means for determining the symbol timing phase of the input signal from the further frequency domain representation.

10. The apparatus of claim 9, wherein the symbol timing phase is determined as a DC component of the further frequency domain representation.

11. The apparatus of claim 9, wherein a width of the window is selected according to a jitter of the symbol timing in the input signal.

12. An apparatus for determining symbol timing in a input signal, comprising:

a first processor module for computing a temporally varying magnitude of the input signal;

a Fourier transform module for determining a frequency domain representation of the computed magnitude of the input signal;

second processor module for identifying a spectral component at a symbol frequency $f_s$ away from a DC component of the frequency domain representation of the computed magnitude of the input signal, the spectral component having a magnitude and a phase; and a third processor module for determining the symbol timing phase of the input signal from the phase of the spectral component.

13. The apparatus of claim 12, wherein Fourier transform module is a fast Fourier transform (FFT) module.

14. The apparatus of claim 12, wherein the third processor module computes a temporal history of the symbol timing phase of the input signal and computes the symbol timing phase of the input signal from the temporal history of the symbol timing phase of the input signal.

15. The apparatus of claim 14, wherein the processor computes a temporal history of the symbol timing phase of the input signal and computes the symbol timing phase of the input signal from the temporal history of the symbol timing phase of the input signal by determining a further frequency domain representation of the frequency domain representation of the computed magnitude of the input signal in a window around the identified spectral component, and determining the symbol timing phase of the input signal from the further frequency domain representation.

16. The apparatus of claim 15, wherein the symbol timing phase is determined as a DC component of the further frequency domain representation.

17. The apparatus of claim 15, wherein a width of the window is selected according to a jitter of the symbol timing in the input signal.

18. A method of acquiring a carrier frequency in a input signal, comprising the steps of:

computing an $N^{th}$ power of the input signal;

determining a frequency domain representation of the computed $N^{th}$ power of the input signal, the frequency domain representation including spectral components spaced at $f_s/N$, wherein $f_s$ is a symbol frequency of the input signal; and selecting one of the spectral components as the acquired carrier frequency.

19. The method of claim 18, wherein the step of determining a frequency domain representation of the computed $N^{th}$ power of the input signal comprises the step of computing a fast Fourier transform (FFT) of the computed $N^{th}$ power of the input signal.

20. The method of claim 18, wherein the input signal comprises a series of symbols selected from a set of N symbols.

21. The method of claim 18, wherein the frequency domain representation includes i spectral components, and wherein the step of selecting one of the spectral components as the carrier frequency comprises the steps of:

determining an energy $\{P_i\}$ of the input signal in a window centered at a frequency of each of the spectral components; and determining the frequency of the spectral component associated with the largest of the i determined energies $\{P_i\}$ as the acquired carrier frequency.

22. The method of claim 18, further comprising the step of determining the carrier phase as the phase of the selected one of the spectral components.

23. The method of claim 22, wherein step of determining the carrier phase of the input as the phase of the selected one of the spectral components comprises the steps of:

computing a temporal history of the carrier phase of the input signal and computing the carrier phase of the input signal from the temporal history of the carrier phase of the input signal.

24. The method of claim 23, wherein the steps of computing a temporal history of the carrier phase of the input signal and computing the carrier phase of the input signal from the temporal history of the carrier phase of the input signal comprises the steps of:

determining a time domain representation of the determined frequency domain representation of the computed $N^{th}$ power of the input signal in a window around the selected one of the spectral components; and determining the carrier phase of the input signal from the time domain representation.

25. An apparatus for acquiring a carrier frequency in a input signal, comprising:

means for computing an $N^{th}$ power of the input signal;

means for determining a frequency domain representation of the computed $N^{th}$ power of the input signal, the frequency domain representation including spectral components spaced at $$\frac{f_s}{N},$$

wherein $f_s$ is a symbol frequency of the input signal; and means for selecting one of the spectral components as the acquired carrier frequency.

26. The apparatus of claim 25, wherein the means for determining a frequency domain representation of the computed $N^{th}$ power of the input signal comprises means for computing a fast Fourier transform (FFT) of the computed $N^{th}$ power of the input signal.

27. The apparatus of claim 25, wherein the input signal comprises a series of symbols selected from a set of N symbols.

28. The apparatus of claim 25, wherein the frequency domain representation includes i spectral components, and wherein the means for selecting one of the spectral components as the carrier frequency comprises:

means for determining an energy $\{P_i\}$ of the input signal in a window centered at a frequency of each of the spectral components; and means for determining the frequency of the spectral component associated with the largest of the i determined energies $\{P_i\}$ as the acquired carrier frequency.

29. The apparatus of claim 25, further comprising means for determining the carrier phase as the phase of the selected one of the spectral components.

30. The apparatus of claim 29, wherein means for determining the carrier phase of the input as the phase of the selected one of the spectral components comprises:

means for computing a temporal history of the carrier phase of the input signal and computing the carrier phase of the input signal from the temporal history of the carrier phase of the input signal.

31. The apparatus of claim 30, wherein the means for computing a temporal history of the carrier phase of the input signal and computing the carrier phase of the input signal from the temporal history of the carrier phase of the input signal comprises:

means for determining a further frequency domain representation of the determined frequency domain representation of the computed $N^{th}$ power of the input signal in a window around the selected one of the spectral components; and means for determining the carrier phase of the input signal from the further frequency domain representation.

32. An apparatus for acquiring a carrier frequency in a input signal, comprising:

a first processor module for computing an $N^{th}$ power of the input signal;

a Fourier transform module for determining a frequency domain representation of the computed $N^{th}$ power of the input signal, the frequency domain representation including spectral components spaced at $$\frac{f_s}{N},$$

wherein $f_s$ is a symbol frequency of the input signal; and a second processor module means for selecting one of the spectral components as the acquired carrier frequency.

33. The apparatus of claim 32, wherein the Fourier transform module is a fast Fourier transform (FFT) module.

34. The apparatus of claim 32, wherein the input signal comprises a series of symbols selected from a set of N symbols.

35. The apparatus of claim 32, wherein the frequency domain representation includes i spectral components, the second processor selects one of the spectral components as the acquired carrier frequency by determining an energy $\{P_i\}$ of the input signal in a window centered at a frequency of each of the spectral components, and selects the frequency of the spectral component associated with the largest of the i determined energies $\{P_i\}$ as the acquired carrier frequency.

36. The apparatus of claim 32, further comprising a third processor module for determining the carrier phase as the phase of the selected one of the spectral components.

37. The apparatus of claim 36, wherein the third processor module determines the carrier phase of the input as the phase of the selected one of the spectral components by computing a temporal history of the carrier phase of the input signal and computing the carrier phase of the input signal from the temporal history of the carrier phase of the input signal.

* * * * *